United States Patent
Resch et al.

(10) Patent No.: US 10,887,293 B2
(45) Date of Patent: Jan. 5, 2021

(54) KEY IDENTIFIERS IN AN OBLIVIOUSNESS PSEUDORANDOM FUNCTION (OPRF)-BASED KEY MANAGEMENT SERVICE (KMS)

(71) Applicant: International Business Machines Corporation, Armonk, NY (US)

(72) Inventors: Jason K. Resch, Chicago, IL (US); Hugo M. Krawczyk, Tarrytown, NY (US); Mark D. Seaborn, Algonquin, IL (US); Nataraj Nagaratnam, Cary, NC (US); Erlander Lo, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 15/926,883

(22) Filed: Mar. 20, 2018

(65) Prior Publication Data
US 2019/0297064 A1   Sep. 26, 2019

(51) Int. Cl.
*H04L 29/00* (2006.01)
*H04L 29/06* (2006.01)
(Continued)

(52) U.S. Cl.
CPC ............ *H04L 63/06* (2013.01); *H04L 9/0656* (2013.01); *H04L 9/0869* (2013.01);
(Continued)

(58) Field of Classification Search
CPC ... H04L 9/3271; H04L 9/0656; H04L 9/0877; H04L 63/06; H04L 9/0869; H04L 9/008; H04L 9/3247; H04L 2209/50
See application file for complete search history.

(56) References Cited

U.S. PATENT DOCUMENTS 5,564,106 A   10/1996   Puhl et al.
5,991,414 A   11/1999   Garay et al.
(Continued)

FOREIGN PATENT DOCUMENTS

WO   2017001972   1/2017

OTHER PUBLICATIONS

Bellare et al., "DupLESS: Server-aided encryption for deduplicated storage," USENIX Security Symposium, 2013 (Year: 2013).*
(Continued)

*Primary Examiner* — Don G Zhao
(74) *Attorney, Agent, or Firm* — James Nock; Andrew D. Wright; Roberts Calderon Safran & Cole, P.C.

(57) ABSTRACT

A computing device includes an interface configured to interface and communicate with a communication system, a memory that stores operational instructions, and processing circuitry operably coupled to the interface and to the memory that is configured to execute the operational instructions to perform various operations. The computing device generates a sub-key identifier based on a data ID, which is based on unique ID value(s) associated with an encrypted data object, and a requester secret. The computing device processes the sub-key identifier in accordance with an Oblivious Pseudorandom Function (OPRF) blinding operation to generate a blinded input and an Oblivious Key Access Request (OKAR). The computing device transmits the OKAR to another computing device (e.g., Key Management System (KMS) service) and receives a blinded sub-key therefrom. The computing device processes the blinded sub-key in accordance with an OPRF unblinding operation to generate the key and accesses secure data thereby.

20 Claims, 13 Drawing Sheets

(51) Int. Cl.
*H04L 9/08* (2006.01)
*H04L 9/32* (2006.01)
*H04L 9/06* (2006.01)

(52) U.S. Cl.
CPC .......... *H04L 9/0877* (2013.01); *H04L 9/3247* (2013.01); *H04L 9/3271* (2013.01)

(56) References Cited

U.S. PATENT DOCUMENTS

| | | | |
|---|---|---|---|
| 6,118,874 | A | 9/2000 | Okamoto |
| 6,411,715 | B1 | 6/2002 | Liskov et al. |
| 7,516,330 | B2 | 4/2009 | Ellison et al. |
| 7,584,363 | B2 | 9/2009 | Canard et al. |
| 8,468,368 | B2 | 6/2013 | Gladwin et al. |
| 8,538,029 | B2 | 9/2013 | Li et al. |
| 8,572,405 | B2 | 10/2013 | Kerschbaum |
| 9,049,011 | B1 | 6/2015 | Agrawal |
| 9,380,036 | B2 | 6/2016 | Parann-Nissany |
| 9,380,037 | B2 | 6/2016 | Parann-Nissany |
| 9,565,020 | B1* | 2/2017 | Camenisch .......... H04L 9/0894 |
| 9,712,320 | B1 | 7/2017 | Kiayias et al. |
| 9,904,632 | B2 | 2/2018 | Johnson et al. |
| 10,235,335 | B1* | 3/2019 | Speers ................. G06F 21/602 |
| 2003/0012386 | A1 | 1/2003 | Kim et al. |
| 2005/0063545 | A1 | 3/2005 | Fujimoto et al. |
| 2005/0066174 | A1* | 3/2005 | Perlman ................ H04L 9/3006 713/176 |
| 2005/0066175 | A1* | 3/2005 | Perlman .............. H04L 63/0428 713/176 |
| 2009/0175442 | A1 | 7/2009 | Feng et al. |
| 2009/0287837 | A1 | 11/2009 | Felsher |
| 2011/0010549 | A1 | 1/2011 | Kolesnikov et al. |
| 2011/0055585 | A1 | 3/2011 | Lee |
| 2011/0126295 | A1 | 5/2011 | Resch |
| 2012/0121080 | A1 | 5/2012 | Kerschbaum |
| 2013/0205379 | A1* | 8/2013 | Kang ................... H04L 9/3271 726/7 |
| 2013/0279692 | A1 | 10/2013 | Bevan |
| 2014/0041039 | A1 | 2/2014 | Saldamli et al. |
| 2014/0237623 | A1 | 8/2014 | Saldamli et al. |
| 2014/0349682 | A1 | 11/2014 | Nawaz |
| 2015/0161398 | A1 | 6/2015 | De Cristofaro |
| 2015/0372811 | A1 | 12/2015 | Le Saint et al. |
| 2016/0065370 | A1 | 3/2016 | Le Saint et al. |
| 2016/0218875 | A1 | 7/2016 | Le Saint et al. |
| 2016/0323102 | A1 | 11/2016 | Freudiger |
| 2017/0177899 | A1* | 6/2017 | Ng ....................... G06F 21/6227 |
| 2017/0222801 | A1 | 8/2017 | Le Saint |
| 2017/0223008 | A1 | 8/2017 | Camenisch |
| 2018/0018286 | A1* | 1/2018 | Axnix ................... H04L 9/0891 |
| 2018/0076956 | A1 | 3/2018 | Camenisch |
| 2018/0157703 | A1 | 6/2018 | Wang |
| 2018/0375652 | A1* | 12/2018 | Karame ................ H04L 9/0819 |
| 2018/0375663 | A1* | 12/2018 | Le Saint ............... H04L 9/3247 |
| 2019/0109711 | A1* | 4/2019 | Gladwin ................ H04L 9/085 |
| 2019/0342270 | A1 | 11/2019 | Laine |
| 2019/0349191 | A1 | 11/2019 | Soriente |
| 2019/0356649 | A1* | 11/2019 | Alwen ................ H04L 63/0815 |

OTHER PUBLICATIONS

National Institute of Standards and Technology; The NIST Definition of Cloud Computing; Special Publication 800-145; Dec. 13, 2016; pp. M-7 to M-13.

List of IBM Patents or Applications Treated as Related, Apr. 18, 2018, 2 pages.

International Searching Authority; International Search Report and Written Opinion; International Application No. PCT/IB2019/051525; dated May 29, 2019; 8 pgs.

Office Action in U.S. Appl. No. 15/926,651 dated Jan. 23, 2020, 15 pages.

Kwon, Moonsang, and Yookun Cho. "Protecting Secret Keys with Blind Computation Service." Third International Workshop on Information Security Applications. 2002. (Year: 2002), 11 pages. In U.S. Appl. No. 15/926,651.

Blaze, Matt. "Oblivious key escrow." International Workshop on Information Hiding. Springer, Berlin, Heidelberg, 1996. (Year: 1996), 9 pages. In U.S. Appl. No. 15/926,651.

Burns, Jonathan, et al. "EC-OPRF: Oblivious Pseudorandom Functions using Elliptic Curves" IACR Cryptology ePrint Archive 2017 (2017): 111. (Year: 2017), 13 pages. In U.S. Appl. No. 15/926,651.

Office Action in U.S. Appl. No. 15/926,822 dated Feb. 20, 2020, 21 pages.

NPL Search Results (Year: 2020), 2 pages. In U.S. Appl. No. 15/926,651.

Boyle et al.; Fully Leakage-Resilient Signatures; Annual International Conference on the Theory and Applications of Cryptographic Technique; EUROCRYPT 2011; pp. 89-108; Lecture Notes in Computer Science, vol. 6632; Springer, Berlin, Heidelberg.

Cohen et al.; Publicly Verifiable Software Watermarking; IACR Cryptology ePrint Archive; Report 2015/373; 2015; pp. 1-38.

Freedman et al; Keyword Search and Oblivious Pseudorandom Functions; Theory of Cryptography, TCC 2005; pp. 303-324; Lecture Notes in Computer Science, vol. 3378; Springer, Berlin, Heidelberg, 2005.

Ibrahim; New Secure Solutions for Privacy and Access Control in Health Information Exchange; Theses and Dissertations—Computer Science; 47; 2016; 170 pgs.

Li et al.; Private Outsourcing of Polynomial Functions; 2014 IEEE 13th International Conference on Trust, Security and Privacy in Computing and Communications; Sep. 24-26, 2014; pp. 61-68.

Jarecki S., et al.; Efficient Oblivious Pseudorandom Function with Applications to Adaptive OT and Secure Computation of Set Intersection; Theory of Cryptography, TCC 2009; Lecture Notes in Computer Science, vol. 5444; 2009; 18 pgs.

Zhu, et al; LEAP: Efficient Security Mechanisms for Large-Scale Distributed Sensor Networks; ACM Transactions on Sensor Networks (TOSN) 2.4; 2004; 14 pgs.

McGrew, et al.; Key Establishment in Large Dynamic Groups Using One-Way Function Trees; IEEE Transactions on Software Engineering 29.5; 1998; 13 pgs.

Office Action dated Apr. 6, 2020, in U.S. Appl. No. 16/112,224, 8 pgs.

Notice of Allowance dated May 5, 2020, in U.S. Appl. No. 15/926,651, 11 pgs.

List of IBM Patents or Patent Applications Treated as Related, Jul. 21, 2020, 1 page.

Notice of Allowance dated Aug. 17, 2020, in U.S. Appl. No. 15/926,651, 10 pages.

Office Action dated Aug. 27, 2020, in U.S. Appl. No. 16/109,856, 15 pages.

Notice of Allowance dated Sep. 2, 2020, in U.S. Appl. No. 15/926,822, 9 pages.

Notice of Allowance dated Oct. 15, 2020, in U.S. Appl. No. 16/112,224, 7 pages.

Rabin, "How to Exchange Secrets with Oblivious Transfer", May 20, 1981, 26 pages.

Anonymous, "Web Search History", Aug. 12, 2020, 1 page.

\* cited by examiner

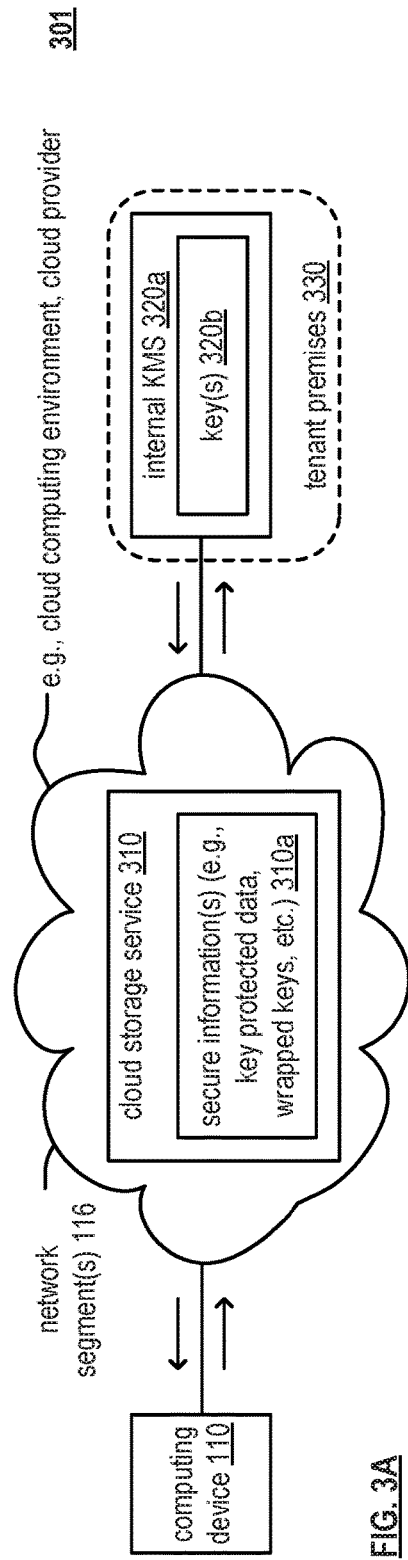
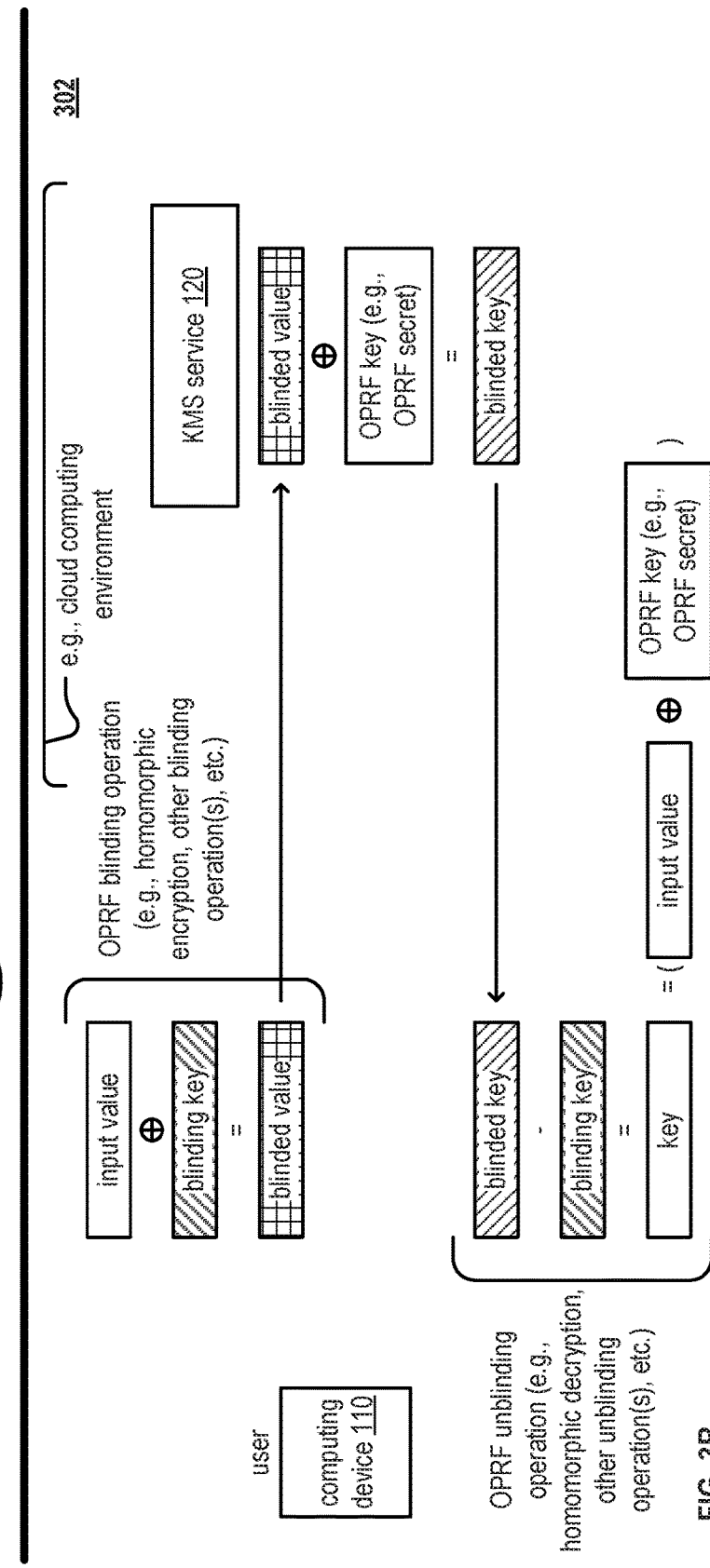
FIG. 3A
FIG. 3B

KEY IDENTIFIERS IN AN OBLIVIOUSNESS PSEUDORANDOM FUNCTION (OPRF)-BASED KEY MANAGEMENT SERVICE (KMS)

BACKGROUND

This invention relates to security, encryption, and key management, and more specifically, to key identifiers (IDs) for use in accordance with operations based on communication systems and communications related to one or more Key Management Systems (KMSs) that operates based on one or more Oblivious Pseudorandom Functions (OPRFs).

In certain prior art communication system systems, ever-increasing quantities of data is stored online. Some data therein is critical, encrypted, secure, and/or private. For example, much of this data is private and some may be protected by confidentiality laws and regulations. Some of the data is encrypted to guard data from malicious insiders, external attackers, and/or accidental exposure requires. Encryption can operate using one or more encryption keys. Without appropriate encryption key(s), encrypted data cannot be deciphered. Therefore, reliable supply and management of keys is essential whenever dealing with encrypted data.

In addition, more recently, certain information is stored within one or more remote storage devices that are operated and maintained by another party. In certain prior art implementations, this other party service provider will have access to and be able to see the one or more encryption keys that is stores, manages, and provides to the clients and/or users that it services. In such situations, such a client and/or user can be totally susceptible and vulnerable to any bad intentions, behavior, lack of trust, etc. of such another party service provider.

The prior art does not provide adequate means by which different respective keys may be organized, processed, and used within such KMSs while also addressing the many deficiencies of prior art systems including problems arising from lack of trust of the service providers of such systems.

SUMMARY

Embodiments of the present invention disclose a computer-implemented method, a system, and a computer program product for providing key identifiers (IDs) to be used in an Oblivious Pseudorandom Function (OPRF)-based Key Management System (KMS). Also, certain embodiments of the present invention disclose a computer-implemented method, a system, and a computer program product for providing for key wrap and unwrap semantics and for providing one or more parameters in identifiers and/or wrapped keys in such an OPRF-based KMS.

A data identifier (ID) is generated based at least one unique ID value associated with an encrypted data object that is encrypted based on a key. Also, a sub-key ID is generated based on the data ID and a requester secret. Then, the sub-key ID is processed based on a blinding key in accordance with an Oblivious Pseudorandom Function (OPRF) blinding operation (e.g., homomorphic encryption, one or more other blinding operations, etc.) to generate a blinded input. An Oblivious Key Access Request (OKAR) is generated based on the blinded input. Communications and/or operations are supported with the KMS. For example, the OKAR is transmitted to another computing device that is associated with a Key Management System (KMS) service and a blinded sub-key is received therefrom. For example, the blinded sub-key is based on processing of the OKAR based on an Oblivious Pseudorandom Function (OPRF) using an OPRF secret. The blinded sub-key then undergoes processing based on the blinding key in accordance with an Oblivious Pseudorandom Function (OPRF) unblinding operation (e.g., homomorphic decryption, one or more other unblinding operations, etc.) to generate the key that is associated with the encrypted data object. In some examples, the encrypted data object is processed based on the key.

BRIEF DESCRIPTION OF THE DRAWINGS

FIG. 3A is a diagram illustrating another embodiment of one or more communication systems supporting a KMS according to various embodiments of the present invention;

FIG. 3B is a diagram illustrating an embodiment of one or more communication systems supporting a KMS based on an Oblivious Pseudorandom Function (OPRF) according to various embodiments of the present invention;

DETAILED DESCRIPTION

According to an embodiment of the present invention, novel key management and key security operates based on obliviousness to provide for security and secrecy of keys that are used such as based on one or more Key Management Systems (KMSs). This novel key management and key security also involves generation of one or more keys in accordance with an Oblivious Pseudorandom Function (OPRF) blinding operation (e.g., homomorphic encryption, one or more other blinding operations, etc.) and/or Oblivious Pseudorandom Function (OPRF) processing. In some examples, this includes performing an OPRF blinding operation (e.g., homomorphic encryption, one or more other blinding operations, etc.) (and an OPRF unblinding operation (e.g., homomorphic decryption, one or more other unblinding operations, etc.)) and supporting OPRF processing based on client (e.g., user) operations and service provider (e.g., KMS) operations. The various entities interact with one another in a manner that the two parties operate cooperatively to evaluate a function and ultimately to provide a key to the client. In accordance with such OPRF processing, the client cannot determine an OPRF secret used by the service provider, and the service provider cannot determine the input and/or output associated with the client. In addition, the service provider cannot see and cannot determine the one or more keys that it provides to one or more clients. Also, in one example of such novel solutions as presented herein, the keys are regenerated each time they are used. This can be used to offload a large amount of storage and also to offload processing load to a large number of clients. This provides for the possible implementation of a scaleable system that takes obviates the need for a centralized server or a Hardware Security Module (HSM) as is used in prior art systems.

In addition, with respect to such OPRF processing, this disclosure presents novel solutions for providing key identifiers (IDs) to be used in an OPRF-based KMS. Further, this disclosure presents novel solutions that may be applied for providing for key wrap and unwrap semantics and for providing one or more parameters in identifiers and/or wrapped keys in such an OPRF-based KMS.

Figure 1A:
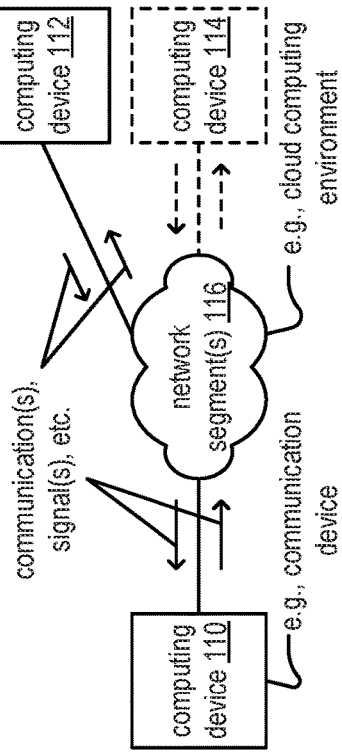
FIG. 1A is a diagram illustrating an embodiment of one or more communication systems supporting a Key Management System (KMS) according to various embodiments of the present invention.

FIG. 1A is a diagram illustrating an embodiment 100 of one or more communication systems supporting a Key Management System (KMS) according to various embodiments of the present invention. One or more computing devices (e.g., computing device 110, computing device 112, etc.) is configured to support communications via one or more other computing devices and/or one or more network segments 116. In one example, the computing device 110 is in communication with a computing device 112 via the one or more network segments 116. For example, the computing device 110 is associated with a first user, and the computing device 112 is associated with a second user. The one or more network segments 116 may be implemented in accordance with a cloud computing environment 50 such as described with reference to FIG. 5, and one or more network segments 116 may include one or more other computing devices therein (e.g., nodes, routers, gateways, servers, relays, transcoders, etc.) in some examples and/or embodiments.

The computing device 110 is configured to access secure information (e.g., secure, private, encrypted, etc. data, keys, etc.) based on one or more keys. Examples of such keys may be of various types including one or more of a Data Encryption Key (DEK), Key Encryption Key (KEK), Wrapped Data Encryption Key (WDEK), Master Key Encryption Key (M-KEK), Instance Key Encryption Key (I-KEK), Customer Root Key (CRK), and/or any other type of key including those associated with and used to encrypt and/or decrypt information, etc.

For example, once a key is generated, the computing device 110 may be configured to use that key to access secure information that is stored within the one or more network segments 116 and/or stored within a cloud-based technology that is based on or accessible via the one or more network segments 116. For example, the computing device 110 requests encrypted data that is stored by a cloud provider, receives that encrypted data that is stored by that cloud provider, and then uses the key to decrypt that encrypted data.

In general, in accordance with such security, encryption, etc., a key is used by the computing device 110 to access secure information (e.g., data, keys, etc.) that are kept unavailable to others that do not have the key. In general, a Key Management System (KMS) may be viewed as being a system for managing, reliably maintaining, and controlling access to keys on behalf computing devices, users, and/or applications, etc. High availability and durability is critical for a KMS. For example, considering a particular instance, if the KMS fails, any attempt to restore data encrypted with keys managed by the KMS will also fail. Security and proper access control enforcement and auditing is also essential. For example, if the wrong entity (e.g., an unauthorized entity) acquires a key from the KMS, the KMS has effectively disclosed to that party all data, keys, etc. encrypted under that key.

Communications between the respective communication devices in this diagram and also in other embodiments, examples, diagrams, etc. herein may include any one or more of communications, signals, blinded values, blinded keys, key identifiers (IDs), wrapped key, unwrapped keys, parameters, etc.

The computing device 110 is configured to access secure information (e.g., secure, private, encrypted, etc. data, keys, etc.) based on one or more keys. Examples of such keys may be of various types including one or more of a Data Encryption Key (DEK), Key Encryption Key (KEK), Wrapped Data Encryption Key (WDEK), Master Key Encryption Key (M-KEK), Instance Key Encryption Key (I-KEK), Customer Root Key (CRK), and/or any other type of key including those associated with and used to encrypt information, etc.

For example, once a key is generated, the computing device 110 may be configured to use that key to access secure information that is stored within the one or more network segments 116 and/or stored within a cloud-based technology that is based on or accessible via the one or more network segments 116. For example, the computing device 110 requests encrypted data that is stored by a cloud provider, receives that encrypted data that is stored by that cloud provider, and then uses the key to decrypt that encrypted data.

In general, in accordance with such security, encryption, etc., a key is used by the computing device 110 to access secure information (e.g., data, keys, etc.) that are kept unavailable to others that do not have the key. In general, a Key Management System (KMS) may be viewed as being a system for managing, reliably maintaining, and controlling access to keys on behalf computing devices, users, and/or applications, etc. High availability and durability is critical for a KMS. For example, considering a particular instance, if the KMS fails, any attempt to restore data encrypted with keys managed by the KMS will also fail. Security and proper access control enforcement and auditing is also essential. For example, if the wrong entity (e.g., an unauthorized entity) acquires a key from the KMS, the KMS has effectively disclosed to that party all data, keys, etc. encrypted under that key.

In an example of operation and implementation, a computing device 110 (e.g., such as associated with a user) is configured to support communications with a Key Management System (KMS) via one or more communication systems (e.g., the Internet, an intranet, a proprietary network, a private network, a public network, etc.) via the one or more network segments 116. In an example of operation and implementation, the computing device 110 is configured to generate a data identifier (ID) based at least one unique ID value associated with an encrypted data object that is encrypted based on a key. The computing device 110 is also configured to generate a sub-key ID based on the data ID and a requester secret and to process the sub-key ID based on a blinding key in accordance with an Oblivious Pseudorandom Function (OPRF) blinding operation (e.g., homomorphic encryption, one or more other blinding operations, etc.) to generate a blinded input. The computing device 110 is also configured to generate an Oblivious Key Access Request (OKAR) based on the blinded input.

The computing device 110 is configured to transmit (e.g., via the one or more communication systems and/or via the one or more network segments 116) the OKAR to another computing device that is associated with a KMS service (shown as KMS service 121). The computing device 110 is configured to receive (e.g., via the one or more communication systems and/or via the one or more network segments 116) a blinded sub-key from the other computing device that is associated with the KMS service (KMS 120). Note that the blinded sub-key is based on processing of the OKAR based on an Oblivious Pseudorandom Function (OPRF) using an OPRF secret. Also, the computing device 110 is configured to process the blinded sub-key based on the blinding key in accordance with an OPRF unblinding operation (e.g., homomorphic decryption, one or more other unblinding operations, etc.) to generate the key that is associated with the encrypted data object. In some examples, the computing device 110 is configured to process the encrypted data object based on the key.

In an example, the computing device 110 is also configured to access (e.g., via the one or more network segments 116) the encrypted data object based on the key. Examples of such secure information may include information that is private, secret, and/or of high value. Examples of such data that may include any one or more of personal information, health data, financial data, strategic plans, competitive information, trade secrets, bitcoin wallets, customer lists, and/or any other type of data that may be private, secret, and/or of high value.

In other examples, the computing device 110 is also configured to perform processing of the encrypted data object based on the key (e.g., such as performing decryption thereof) or generating the encrypted data object based on the key (e.g., such as performing encryption of a data object to generate the encrypted data object).

Figure 1B:
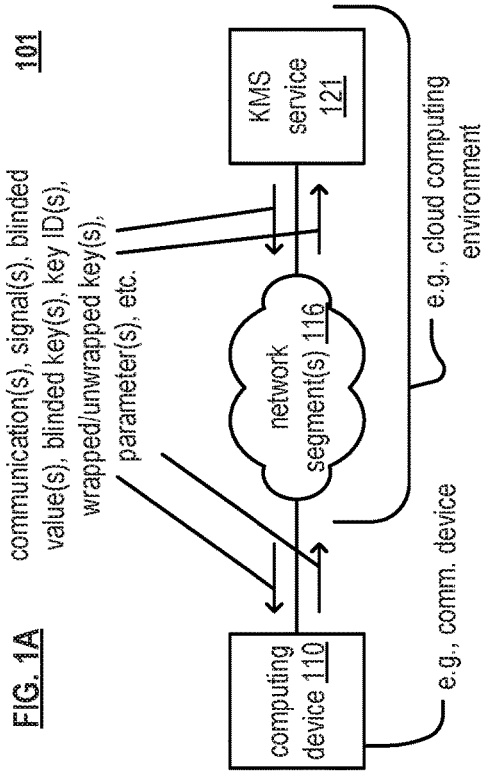
FIG. 1B is a diagram illustrating an embodiment of one or more communication systems according to various embodiments of the present invention.

FIG. 1B is a diagram illustrating an embodiment 102 of one or more communication systems according to various embodiments of the present invention. One or more network segments 116 provide communication inter-connectivity for at least two computing devices 110 and 112 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation and implementation, device 110 includes a communication interface to support communications with one or more of the other devices 112-114. In an example, the computing device 110 includes a communication interface configured to interface and communicate with a communication network (e.g., the one or more network segments 116), memory that stores operational instructions, and a processor coupled to the communication interface and to the memory. The processor is configured to execute the operational instructions to perform various functions, operations, etc. Note that the communication supported by the computing device 110 may be bidirectional/to and from the one or more of the other computing devices 112-114 or unidirectional (or primarily unidirectional) from the one or more of the other computing devices 112-114.

In one example, computing device 110 includes a processor that generates, modulates, encodes, etc. and transmits signals via a communication interface of the computing device 110 and also receives and processes, demodulates, decodes, etc. other signals received via the communication interface of the computing device 110 (e.g., received from other computing devices such as computing device 112, computing device 114, etc.).

Note also that the communication interface 120 may include functionality to support receipt of user input and output of user output (e.g., via a touchscreen, a keyboard, audio and/or video input/output ports, etc.) to facilitate interaction with one or more users of the computing device 110-1. Such functionality is implemented separately from the communication interface 120 in some examples and is integrated into the communication interface 120 in other examples.

In an example of operation, computing device 110 (e.g., such as associated with a user) is configured to support communications with one or more other computing devices (e.g., computing device 112 and/or computing device) that is or are associated with a KMS via one or more communication systems (e.g., the Internet, an intranet, a proprietary network, a private network, a public network, etc.) via the one or more network segments 116. In an example of operation and implementation, the computing device 110 is configured to generate a ID based at least one unique ID value associated with an encrypted data object that is encrypted based on a key. The computing device 110 is also configured to generate a sub-key ID based on the data ID and a requester secret and to process the sub-key ID based on a blinding key in accordance with an OPRF blinding operation (e.g., homomorphic encryption, one or more other blinding operations, etc.) to generate a blinded input. The computing device 110 is also configured to generate an OKAR based on the blinded input.

The computing device 110 is configured to transmit (e.g., via the one or more communication systems and/or via the one or more network segments 116) the OKAR to computing device 112 that is associated with a KMS service (shown as KMS service 121). The computing device 110 is configured to receive (e.g., via the one or more communication systems and/or via the one or more network segments 116) a blinded sub-key from the other computing device that is associated with the KMS service (computing device 112). Note that the blinded sub-key is based on processing of the OKAR based on an Oblivious Pseudorandom Function (OPRF) using an OPRF secret. Also, the computing device 110 is configured to process the blinded sub-key based on the blinding key in accordance with an OPRF unblinding operation (e.g., homomorphic decryption, one or more other unblinding operations, etc.) to generate the key that is associated with the encrypted data object. In some examples, the computing device 110 is configured to process the encrypted data object based on the key. In some examples, the computing device 110 is configured to use the key to access secure information (e.g., via the communication system such as via the one or more network segments 116, based on locally available and/or stored secure information, and/or combination thereof, etc.).

Figure 1C:
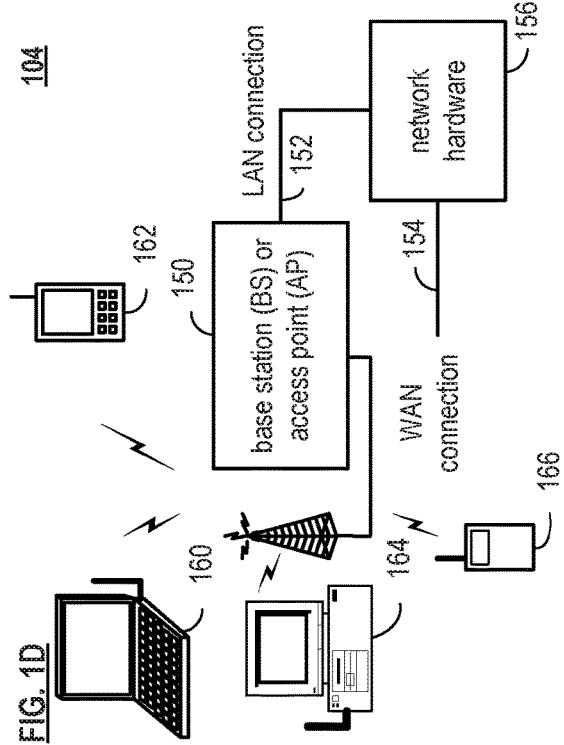
FIG. 1C is a diagram illustrating an embodiment of a computing device configured to operate within one or more communication systems according to various embodiments of the present invention.

FIG. 1C is a diagram illustrating an embodiment 103 of a computing device configured to operate within one or more communication systems according to various embodiments of the present invention. The computing device 110-1 includes a communication interface 120 and processing circuitry 130. The communication interface 120 includes functionality of a transmitter 122 and a receiver 124 to support communications with one or more other devices within a communication system. The computing device 110-1 may also include memory 140 to store information including one or more signals generated by the computing device 110-1 or such information received from other devices (e.g., computing device 112) via one or more communication channels. For example, memory 140 may also include and store various operational instructions for use by the processing circuitry 130 in regards to the processing of messages and/or other received signals and generation of other messages and/or other signals including those described herein (e.g., image and/or video signals). Memory 140 may also store information including one or more types of encoding, one or more types of symbol mapping, concatenation of various modulation coding schemes, etc. as may be generated by the computing device 110-1 or such information received from other devices via one or more communication channels. The communication interface 120 supports communications to and from one or more other devices (e.g., computing device 112-1 and/or other computing devices). Memory 140 may also store information including one or more types of video and/or image processing in accordance with the various aspects, embodiments, and/or examples, and their equivalents, described herein.

Operation of the communication interface 120 may be directed by the processing circuitry 130 such that processing circuitry 130 transmits and receives signals (TX(s) and RX(s)) via the communication interface 120. Generally speaking, computing device 110-1 is able to support communications with one or more other computing device within one or more communication systems including computing device 112-2.

A computing device 110-1 (e.g., which may be any one of computing devices 110, 112, or 114 as with reference to FIG. 1B) is in communication with another computing device 112-1 (and/or any number of other wireless computing devices) via a communication medium. The computing device 110-1 includes a communication interface 120 to perform transmitting and receiving of at least one signal, symbol, packet, and/or frame, etc. (e.g., using a transmitter 122 and a receiver 124) (note that general reference to packet or frame may be used interchangeably).

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 110-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 110-1 also includes a processing circuitry 130, and an associated memory 140, to execute various operations including interpreting at least one signal, symbol, packet, and/or frame transmitted to computing device 112-1 and/or received from the computing device 112-1 and/or any other computing device. The computing devices 110-1 and 112-1 may be implemented using at least one integrated circuit in accordance with any desired configuration or combination of components, modules, etc. within at least one integrated circuit. Also, the computing devices 110 and/or 112 may each include one or more antennas for transmitting and/or receiving of at least one packet or frame wirelessly (e.g., computing device 110-1 may include m antennas, and computing device 112-1 may include n antennas, where m and n are positive integers).

Also, in some examples, note that one or more of the processing circuitry 130, the communication interface 120 (including the TX 122 and/or RX 124 thereof), and/or the memory 140 may be implemented in one or more "processing modules," "processing circuits," "processors," and/or "processing units" or their equivalents. Considering one example, a system-on-a-chip (SOC) 130a may be implemented to include the processing circuitry 130, the communication interface 120 (including the TX 122 and/or RX 124 thereof), and the memory 140 (e.g., SOC 130a being a multi-functional, multi-module integrated circuit that includes multiple components therein). Considering another example, processing-memory circuitry 130b may be implemented to include functionality similar to both the processing circuitry 130 and the memory 140 yet the communication interface 120 is a separate circuitry (e.g., processing-memory circuitry 130b is a single integrated circuit that performs functionality of a processing circuitry and a memory and is coupled to and also interacts with the communication interface 120).

Considering even another example, two or more processing circuitries may be implemented to include the processing circuitry 130, the communication interface 120 (including the TX 122 and/or RX 124 thereof), and the memory 140. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 110-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 110-1 includes both processing circuitry 130 and communication interface 120 configured to perform various operations. In other examples, the computing device 110-1 includes SOC 130a configured to perform various operations. In even other examples, the computing device 110-1 includes processing-memory circuitry 130b configured to perform various operations. Generally, such operations include generating, transmitting, etc. signals intended for one or more other computing device (e.g., computing device 112-1) and receiving, processing, etc. other signals received for one or more other devices (e.g., computing device 112-1).

In some examples, note that the communication interface 120, which is coupled to the processing circuitry 130, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 110-1 may be communicated via any of these types of communication systems.

Note that computing device 110-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 120 configured to interface and communicate with a communication network, memory 140 that stores operational instructions, and processing circuitry 130 coupled to the communication interface and to the memory.

The processing circuitry 130 is configured to execute the operational instructions to perform various functions, operations, and processes (sometimes in cooperation with the communication interface 120 and/or the memory 140). In an example, the processing circuitry 130 is configured to support communications with one or more other computing devices (e.g., computing device 112-1 and/or computing device) that is or are associated with a KMS via one or more communication systems (e.g., the Internet, an intranet, a proprietary network, a private network, a public network, etc.) via the one or more network segments 116. In an example of operation and implementation, the processing circuitry 130 is configured to generate a ID based at least one unique ID value associated with an encrypted data object that is encrypted based on a key. The processing circuitry 130 is also configured to generate a sub-key ID based on the data ID and a requester secret and to process the sub-key ID based on a blinding key in accordance with an OPRF blinding operation (e.g., homomorphic encryption, one or more other blinding operations, etc.) to generate a blinded input. The processing circuitry 130 is also configured to generate an OKAR based on the blinded input.

The processing circuitry 130 is configured to transmit (e.g., via the communication interface 120 and via one or more communication systems and/or via the one or more network segments 116) the OKAR to computing device 112-1 that is associated with a KMS service (shown as KMS service 121). The processing circuitry 130 is configured to receive (e.g., via the communication interface 120 and via the one or more communication systems and/or via the one or more network segments 116) a blinded sub-key from the other computing device that is associated with the KMS service (computing device 112-1). Note that the blinded sub-key is based on processing of the OKAR based on an Oblivious Pseudorandom Function (OPRF) using an OPRF secret. Also, the processing circuitry 130 is configured to process the blinded sub-key based on the blinding key in accordance with an OPRF unblinding operation (e.g., homomorphic decryption, one or more other unblinding operations, etc.) to generate the key that is associated with the encrypted data object. In some examples, the processing circuitry 130 is configured to process the encrypted data object based on the key. In some examples, the computing device 110-1 is configured to use the key to access secure information (e.g., via the communication system, based on locally available and/or stored secure information, and/or combination thereof, etc.).

Figure 1D:
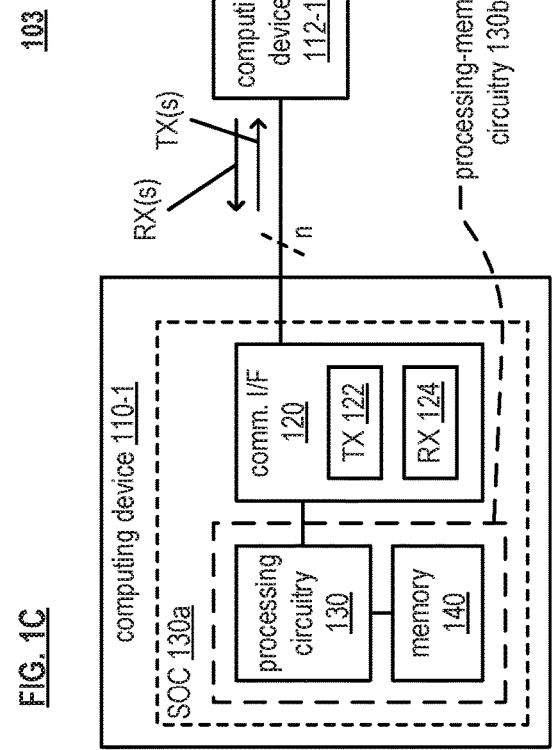
FIG. 1D is a diagram illustrating an embodiment of a wireless communication system according to various embodiments of the present invention.

FIG. 1D is a diagram illustrating an embodiment 100 of a wireless communication system according to various embodiments of the present invention. The wireless communication system includes one or more base stations and/or access points 150, wireless communication devices 160-166 (e.g., wireless stations (STAs)), and a network hardware component 156. The wireless communication devices 160-166 may be laptop computers, or tablets, 160, personal digital assistants 162, personal computers 164 and/or cellular telephones 166 (and/or any other type of wireless communication device). Other examples of such wireless communication devices 160-166 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 150 are operably coupled to the network hardware 156 via local area network connection 152. The network hardware 156, which may be a router, switch, bridge, modem, system controller, etc., provides a wide area network connection 154 for the communication system. Each of the one or more base stations or access points 150 has an associated antenna or antenna array to communicate with the wireless communication devices in its area. Typically, the wireless communication devices register with a particular base station or access point 150 to receive services from the communication system. For direct connections (i.e., point-to-point communications), wireless communication devices communicate directly via an allocated channel.

Any of the various wireless communication devices (WDEVs) 160-166 and one or more BSs or APs 150 may include a processing circuitry and/or a communication interface to support communications with any other of the wireless communication devices 160-166 and one or more BSs or APs 150. In an example of operation, a processing circuitry and/or a communication interface implemented within one of the devices (e.g., any one of the WDEVs 160-166 and one or more BSs or APs 150) is/are configured to process at least one signal received from and/or to generate at least one signal to be transmitted to another one of the devices (e.g., any other one of the one or more WDEVs 160-166 and one or more BSs or APs 150).

Note that general reference to a communication device, such as a wireless communication device (e.g., WDEVs) 160-166 and one or more BSs or APs 150 in FIG. 1D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 160-166 and one or more BSs or APs 150, may be configured to support communications with any other of the various devices, WDEVs 160-166 and one or more BSs or APs 150. Such communications may be uni-directional or bi-directional between devices. Also, such communications may be uni-directional between devices at one time and bi-directional between those devices at another time.

In an example, a device (e.g., any one of the WDEVs 160-166 and one or more BSs or APs 150) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 160-166 and one or more BSs or APs 150) includes a processing circuitry to support communications with one or more of the other wireless communication devices (e.g., any other of the WDEVs 160-166 and one or more BSs or APs 150). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 160-166 and one or more BSs or APs 150) includes a processing circuitry, a communication interface, and a memory configured to support communications with one or more of the other wireless communication devices (e.g., any other of the WDEVs 160-166 and one or more BSs or APs 150).

In an example of operation and implementation, WDEV 160 (e.g., such as associated with a user) is configured to support communications with one or more other computing devices (e.g., computing device 112 and/or computing device) that is or are associated with a KMS via one or more communication systems (e.g., the Internet, an intranet, a proprietary network, a private network, a public network, etc.) via the one or more network segments 116. In an example of operation and implementation, the WDEV 160 is configured to generate a ID based at least one unique ID value associated with an encrypted data object that is encrypted based on a key. The WDEV 160 is also configured to generate a sub-key ID based on the data ID and a requester secret and to process the sub-key ID based on a blinding key in accordance with an OPRF blinding operation (e.g., homomorphic encryption, one or more other blinding operations, etc.) to generate a blinded input. The WDEV 160 is also configured to generate an OKAR based on the blinded input.

The WDEV 160 is configured to transmit (e.g., via the one or more communication systems and/or via the one or more network segments 116) the OKAR to another computing device (e.g., WDEV 164 and/or some other computing device via network hardware 156) that is associated with a KMS service. The WDEV 160 is configured to receive (e.g., via the one or more communication systems and/or via the one or more network segments 116) a blinded sub-key from the other computing device that is associated with the KMS service (computing device 112). Note that the blinded sub-key is based on processing of the OKAR based on an Oblivious Pseudorandom Function (OPRF) using an OPRF secret. Also, the WDEV 160 is configured to process the blinded sub-key based on the blinding key in accordance with an OPRF unblinding operation (e.g., homomorphic decryption, one or more other unblinding operations, etc.) to generate the key that is associated with the encrypted data object. In some examples, the WDEV 160 is configured to process the encrypted data object based on the key. In some examples, the WDEV 160 is configured to use the key to access secure information (e.g., via the communication system, based on locally available and/or stored secure information, and/or combination thereof, etc.).

Figure 2A:
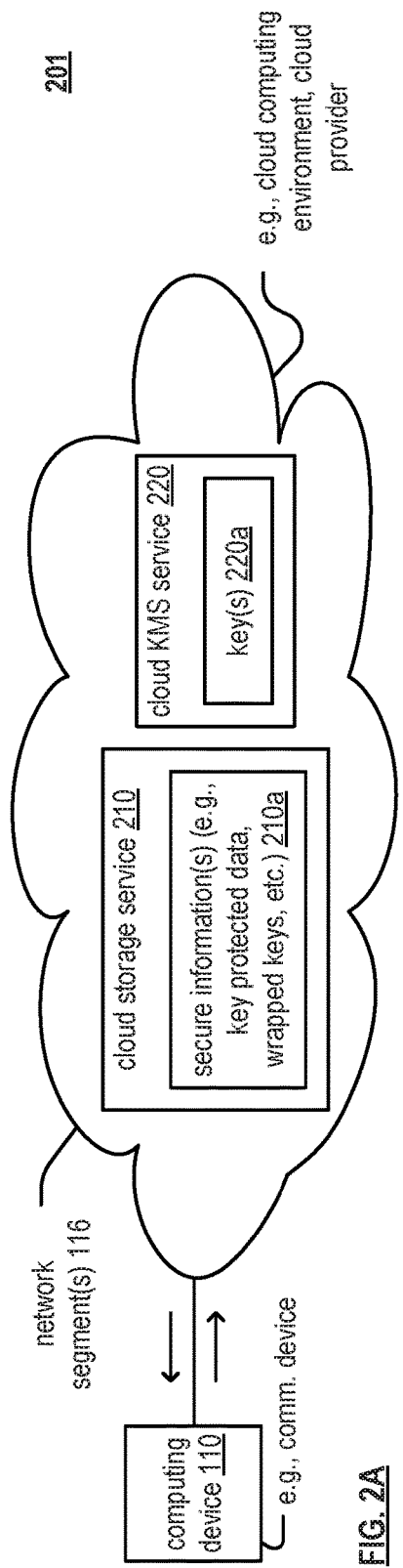
FIG. 2A is a diagram illustrating another embodiment of one or more communication systems supporting a KMS according to various embodiments of the present invention.

FIG. 2A is a diagram illustrating another embodiment 201 of one or more communication systems supporting a KMS according to various embodiments of the present invention. This diagram shows a computing device 110 that is configured to interact with a cloud storage service 210 and a cloud Key Management System (KMS) service 220 that are both implemented within the same environment (e.g., one or more network segments 116 that may be implemented as a cloud computing environment, a cloud provider, etc.). The cloud storage service 210 may include various types of one or more secure information 210a (e.g., key protected data, wrapped key, etc. and/or other secure information). The cloud KMS service 220 may include one or more keys 220a that may be used by one of more users associated with one or more computing devices to access the various types of one or more secure information 210a.

In this implementation, when the same cloud provider is used for both the cloud storage service 210 and the cloud KMS service 220, a malicious insider or corrupt cloud provider could access tenant data. As such, trust requirements are maximized in order to ensure the security of the data. For example, a customer using the same provider for both services (e.g., the cloud storage service 210 and the cloud KMS service 220) requires that they have complete confidence in that provider and its processes.

Figure 2B:
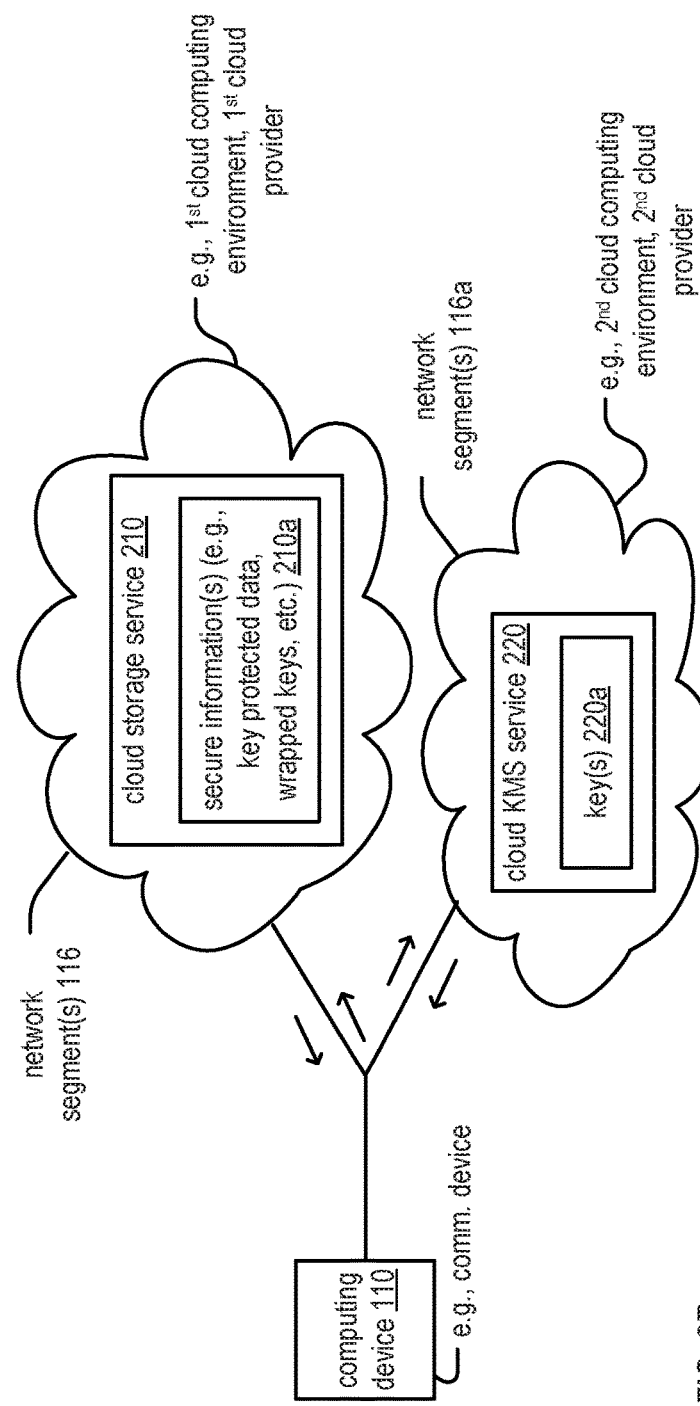
FIG. 2B is a diagram illustrating another embodiment of one or more communication systems supporting a KMS according to various embodiments of the present invention.

FIG. 2B is a diagram illustrating another embodiment 202 of one or more communication systems supporting a KMS according to various embodiments of the present invention. This diagram shows a computing device 110 that is configured to interact with a cloud storage service 210 and a cloud KMS service 220 that are separately implemented within different environments (e.g., the cloud storage service 210 implemented based on one or more network segments 116 that may be implemented as a first cloud computing environment, a cloud provider, etc., and the KMS service 220 based on one or more network segments 116a that may be implemented as a second cloud computing environment, a cloud provider, etc.). Similarly as described above, the cloud storage service 210 may include various types of one or more secure information 210a (e.g., key protected data, wrapped key, etc. and/or other secure information), and the cloud KMS service 220 may include one or more keys 220a that may be used by one of more users associated with one or more computing devices to access the various types of one or more secure information 210a.

In this implementation, when two separate and distinct cloud providers are used for the cloud storage service 210 and a cloud KMS service 220, respectively, there can be higher complexity of the overall system, and there can be a likelihood of incompatible Application Program Interfaces (APIs). As such certain interoperability issues and other problems may emerge. For example, note that while customer doesn't necessarily need to have complete trust in any one specific provider, this implementation can unfortunately introduce a number of interoperability issues. For example, APIs and libraries for interfacing between the two services may not be compatible. Also, functions such as "Server Side Encryption" (SSE) may not work at all in such an implementation.

FIG. 3A is a diagram illustrating another embodiment 301 of one or more communication systems supporting a KMS according to various embodiments of the present invention. This diagram shows a computing device 110 that is configured to interact with a cloud storage service 310 and an internal KMS service 320a that may be implemented at a tenant premises 330. For example, the tenant premises 330 may be located remotely from the computing device 110 and is accessible via one or more network segments 116 that may be implemented as a cloud computing environment, a cloud provider, etc. Similarly as described above with respect to other embodiments and examples, the cloud storage service 310 may include various types of one or more secure information 310a (e.g., key protected data, wrapped key, etc. and/or other secure information), and the internal KMS service 320 may include one or more keys 320b that may be used by one of more users associated with one or more computing devices to access the various types of one or more secure information 310a.

In this implementation, when a tenant uses cloud storage (e.g., cloud storage service 310) to operate with an internal KMS service 320, the customer needs not necessarily have complete trust with the cloud provider, but such an implementation can require significant processes, expertise and expense to manage one's own KMS. Such an implementation can be very expensive.

For example, this diagram shows an implementation of a user of the cloud that may have little to no trust in the cloud provider to protect the security of its one or more keys. For example, such a user may trust a cloud storage provider to store encrypted data, yet that user trusts no cloud provider with holding of its one or more keys. In this implementation, while the user doesn't necessarily have to trust the cloud provider, the implementation can be problematic for various reasons including being very expensive, requiring a rare expertise, special-purpose equipment, requiring disaster recovery plan(s), trusted staff, and rigorous policies. Without these, it is very likely to be less reliable or less secure in practice than a cloud KMS.

Many such implementations of KMSs based on cloud-based technologies suffer for various reasons including requiring placing significant trust in a single provider and/or requiring the maintenance of one's own KMS infrastructure. This disclosure addresses such deficiencies and problems in the prior art including to provide a KMS that does not require any trust in the cloud provider and also needs no KMS infrastructure in the tenant premises. Such novel solutions as presented herein minimizes any required trust in a KMS service provider. For example, the one or more keys never leave customer premises, and the KMS service provider never sees those one or more keys. Also, no one can access the one or more keys without authenticating to the KMS provider. In addition, such novel solutions as presented herein provides for post-quantum security, in that, even with the advent of quantum capability of performing near limitless computation operations, the novel implementation as presented herein is immune to such advances in computing technology as may be targeted for hacking, invasive processes, etc. For example, a novel key access protocol approach as presented herein is immune from attackers with unlimited computational resources, including those with quantum computers.

Also, within such novel solutions as presented herein, the security of the keys if not dependent on the security of one or more communication channels over which communications are made. For example, some prior art approaches operate based on Transport Layer Security (TLS) and/or other means by to effectuate secure communications.

In addition, such novel solutions as presented herein provides for everlasting security, in that, the one or more keys remain secure. For example, even in the unfortunate event in which a KMS service provider is completely breached, the one or more keys remain totally secure. Note that some implementations may be implemented as requiring unpredictable key identifiers (ids) (e.g., using a "key id as a second factor"). Such novel solutions as presented herein obviates the requirement to have full and complete trust in a KMS service provider in terms of using or exposing the one or more keys the user wants the KMS service provider to store. The user may still seek a KMS service provider that does provide a highly available/reliable system, but the trust in that same KMS service provider to trust fully the KMS service provider in terms of using or exposing the one of more keys is obviated.

In an implementation when the tenant of a cloud KMS service provider trusts the provider with his keys, the tenant may operate by either storing them for later retrieval or in unwrapping them. In both cases, the cloud KMS service provider will sees the tenant's keys. Such novel solutions as presented herein provides for a means by which the cloud KMS service provider will never see the tenant's keys.

FIG. 3B is a diagram illustrating an embodiment 302 of one or more communication systems supporting a KMS based on an Oblivious Pseudorandom Function (OPRF) according to various embodiments of the present invention. An OPRF enables the tenant to get keys from the Cloud KMS provider. The property of obliviousness ensures the provider is cryptographically, mathematically, and provably not able to see or determine the keys. With respect to this diagram note that the "+" and "−" operations depicted therein are not arithmetical addition and subtraction per se.

These operations may be exponentiation modulo a prime, or multiplication over an elliptic curve, or some other operations.

Considering an OPRF, an OPRF allows two parties to evaluate a function, Y, as follows:

Y=OPRF(K, X)

The OPRF secret K is only known to "Bob"; Alice can't determine it.

Output Y and input X are only known to "Alice"; Bob can't determine either.

An Oblivious PRF enables an ideal Cloud KMS:

The tenant uses "X" as a "key id" and "Y" as the key (DEK or KEK)

The OPRF guarantees the provider learns nothing about the key

The provider holds the OPRF secret: "K", functioning as a "CRK"

The OPRF can be viewed a key derivation that occurs on a blinded value (e.g., on a homomorphically encrypted cipher text). Note that certain examples herein are described with respect to an OPRF blinding operation that is performed using homomorphic encryption (and a an OPRF unblinding operation that is performed using homomorphic decryption), in general, any OPRF blinding/OPRF unblinding operation may be used such that the process that performs the OPRF blinding/OPRF unblinding operation are known to client (e.g., user, computing device 110 such as "Alice," and not to "Bob"). One example of such OPRF blinding/OPRF unblinding operation includes homomorphic encryption/homomorphic decryption. However, in general, any function may be used by the perform the OPRF blinding/OPRF unblinding operation to generate a blinded value that is unknown to the other computing device that is associated with the KMS service (e.g., server/KMS service 121 ("Bob")). For example, any desired function or mapping of an input value to generate an unknown input value (unknown to the other computing device that is associated with the KMS service such as server/KMS service 121 ("Bob")). Then, the client (e.g., user, computing device 110) knows how to perform the appropriate OPRF unblinding based on the OPRF blinding that was performed in that instance.

With respect to such an OPRF blinding operation that is performed using homomorphic encryption, the client (e.g., user, computing device 110) applies a homomorphic one-time-pad encryption key to an input value. For example, the client starts with some input value from which it wants to derive a key. For example, this input value could be a key id. The client then encrypts the input value with a one-time-pad encryption key (e.g., homomorphic one-time-pad encryption). The one-time-pad encryption key is randomly generated for this key recovery only and is or may be thrown away afterwards (e.g., not saved for future use).

This is an OPRF blinding operation that is performed using homomorphic encryption, and a one-time-pad. Accordingly, the encrypted (or blinded) result reveals zero information about the input. This cipher text (blinded value) is then sent to the server/KMS service 121. The server/KMS service 121 uses the OPRF key (e.g., a Customer Root Key (CRK) in some examples, an OPRF secret) to perform a key derivation function on this cipher text and returns it to the user.

Because of the homomorphic properties of the encryption, when the client (e.g., user, computing device 110) decrypts the result from the server/KMS service 121, it finds it gets the same value as had the server performed its key derivation function directly against the plaintext value. This result is considered the key. The resulting key is equal to the key derivation function (KDF) (e.g., a deterministic function used to generate the key) applied to the input.

Note that even if the client had chosen a different random blinding key, note that the resulting key that would be generated would be the same. In fact, all possible blinded values are possible with any possible input value. This is why the server, and any eavesdroppers, gain no information about the input value or the derived key, from seeing what goes over the wire, network segment(s), cloud, etc. to the server/KMS service 121.

Note that this is from of homomorphic encryption is a special-case form that is extremely efficient and practical. Note also that Hardware Security Modules (HSMs) are quoted as capable of performing 10s of thousands of such operations per second. CPUs can perform upwards of hundreds of thousands per second.

Also, note that the Key is derived from the "Input Value" combined with the "OPRF Key" (e.g., an OPRF secret). Note also that the holder of the OPRF Key, the server/KMS service 121, never sees the Input Value, nor the Resulting key. This is enforced by a process of "Blinding" where both the input and the output are blinded in an information theoretically (quantum secure) way, such that the input and output yields zero information about the Key, neither to the KMS service, hackers, or the NSA. The following steps may be viewed as effectuating this process and exchange between a client (e.g., user, computing device 110) and server/KMS service 121:

1. Tenant generates random key: R
2. Tenant encrypts the "key id" using the random key: ER{key-id}
3. Tenant sends encrypted result to the Cloud KMS provider
4. Cloud KMS provider encrypts result with its own key: P
5. Cloud KMS provider returns the result to the tenant: EP{ER{key-id}}
6. Tenant decrypts it with his random key R to get: Ep{key-id}

In some examples, a computing device 110 (e.g., a client such as associated with a user) is configured to process an input value that is associated with a key based on a blinding key in accordance with homomorphic encryption to generate a blinded value. The computing device is configured to transmit, via a communication system, the blinded value to another computing device (server/KMS service 121) that is associated with a Key Management System (KMS) service. The computing device is configured to receive, via the communication system and from the other computing device (server/KMS service 121) that is associated with the KMS service, a blinded key. The blinded key is based on processing of the blinded value based on an OPRF using an OPRF secret. For example, the server/KMS service 121 is configured to on processing of the blinded value based on the OPRF using the OPRF secret. The computing device 110 is then configured to process the blinded key based on the blinding key in accordance with homomorphic decryption to generate the key that is associated with the input value. In some examples, the computing device 110 is also configured to access, via the communication system, secure information based on the key.

In an example of operation and implementation, once the key is generated, the computing device 110 uses that key to access secure information that is stored within a cloud-based technology that is based on or accessible via the one or more network segments. For example, the computing device 110 requests encrypted data that is stored by a cloud provider, receives that encrypted data that is stored by that cloud provider, and then uses the key to decrypt that encrypted data.

Further understanding of an Oblivious Pseudorandom Function (OPRF) may be made based on consideration of a Pseudorandom Function (PRF) (e.g., that is not oblivious). A Pseudorandom Function (PRF) is a function that takes two inputs:

1. a PRF key "K"; and
2. an arbitrary message "M".

From these two inputs, the PRF returns a "pseudorandom" output. This is an output that is statistically indistinguishable from random output. Also, the output is infeasible to be predicted without knowledge of K. These two properties make PRFs well-suited for key derivation, that is, creating sub-keys from some top-level "root" key. For example, an unlimited number of sub-keys may be computed from a PRF as follows:

sub-key_1=PRF(K, "1"), sub-key_2=PRF(K, "2"), sub-key_3=PRF(K, "3"), . . . , sub-key_n=PRF(K, "n")

This can simplify key management, as only a single top-level, or root key needs to be persisted while supporting a virtually unlimited number of derived keys.

In a Key Management System (KMS), users of the KMS may interact with the KMS to obtain encryption keys. An example of operation between a KMS requester (e.g., a computing device, a user such as associated with a computing device, etc.) and a KMS unit (e.g., another computing device, a KMS service, etc.) is as follows:

1. The requester seeking to access a key sends a Key Access Request (KAR) to a KMS unit, the request can include any one or more of:
   a. a requester identifier (requester ID);
   b. a root key identifier (root key ID);
   c. a sub-key identifier (sub-key ID);
   d. authenticating information (e.g., credentials such as a password, a token, a response to a challenge, a signature, a digital certificate, etc.); and/or
   e. a challenge to the KMS unit (e.g., for the KMS unit to prove its identity or correctness of operation to the requester).
2. The KMS unit performs validation of the request, including any one or more of:
   a. Ensuring the credentials are correct for the requester identifier; and/or
   b. Ensuring the requester is authorized to access a key derived from the given root key identifier.
3. If not authorized, the KMS unit returns an error response and may create an audit log of the failure or take other corrective actions. If the request is authorized, the KMS unit proceeds to the next step.
4. The KMS unit processes the access request, by using the appropriate root key (either the one indicated in the request, or by inferring it from other information, such as the requester identifier) together with the sub-key ID to compute a sub-key. For example, when using a PRF to derive a sub-key, the KMS unit may compute that subkey S, as S=PRF(root-key, sub-key ID). The KMS unit may create an audit log of the successful access request. It then proceeds to the next step.
5. If a challenge was provided by the requester to the KMS unit, the KMS unit generates a response to the challenge (e.g., a question, and a response to that question that compares favorably with the question)
6. The KMS unit returns a response to the requester including the sub-key and a challenge if one was generated 7. The requester validates the response to the challenge (if provided), and if it is valid, proceeds to use the sub-key (e.g., to perform encryption or decryption operations).

One downside to using a PRF in this way is that the KMS unit learns all the sub-keys returned to requesters, as the KMS unit computes the PRF and sees the input and output of the function. This makes the KMS service a central point of compromise for all the keys used by all the requesters in the system.

Such novel solutions as presented herein provides for applying a function known as an Oblivious Pseudorandom Function (OPRF). This can be enable secure access of keys by requesters from the KMS without the KMS being able to observe the keys and/or sub-keys that are requested and returned.

An OPRF works as follows. It takes two inputs:
1. an OPRF key "K" (e.g., an OPRF secret)
2. an arbitrary message "M" (e.g., a key ID, a label, a user-provided identifier, etc.)

From these two inputs, the OPRF also returns a pseudo-random output. However, unlike the PRF, the OPRF is computed by two parties (e.g., the requester and the KMS). The first party supplies the input "M", while the second party supplies the OPRF key "K". Only the first party receives (or can learn) the output of the OPRF. In the course of the computation, the first party does not learn any information about "K". There are multiple implementations of OPRFs, including ones based on asymmetric encryption algorithms, RSA, blind signatures, Diffie-Hellman exponentiation, Elliptic Curve scalar multiplication, homomorphic encryption, and others. The general principle upon which OPRFs operate is that the first party obscures or "blinds" the input message "M" into a form which is meaningless to the second party before sending that second party. The second party then operates upon the input with a certain function that takes both the blinded input "B" along with the OPRF key "K" to produce a "blinded output" which is not the final output, but which is sent from the second party to the first party. The first party, with knowledge of how the original input was obscured, can then determine how to undo the impact of that operation from the blinded output, and recover the OPRF output. Because the reversal of the blinding is done by the first party, the second party never learns the OPRF output.

Taking the properties of the OPRF, and the design of the KMS described above together, the two may be merged to form a KMS which has superior security properties when compared to that which is provided in the prior art. This is done by substituting the PRF with an OPRF, and by having the requester perform some additional pre-processing of the request and some post-processing of the response. The workflow with for an interaction with a KMS based on an OPRF might be as follows:

1. The requester obscures one of the inputs to a key derivation function, for example, a sub-key identifier, by using an appropriate blinding function for the OPRF that is used by the KMS unit. This produces a blinded-input "B". In some examples, the size of the blinding key is same as the size of the input provided thereto. For example, if the input is X bits or bytes in length, then the blinding key X bits or bytes in length (where X is a positive integer).

2. The requester seeking to access a key sends an Oblivious Key Access Request (OKAR) to a KMS unit, the request can include any one or more of:
 a. a requester identifier;
 b. a root key identifier (e.g., additional information to reference a specific OPRF key, e.g., a specific OPRF secret);
 c. a blinded input B (e.g., B=BlindingFunction(sub-key identifier));
 d. authenticating information (e.g., credentials such as a password, a token, a response to a challenge, a signature, a digital certificate, etc.); and/or
 e. A challenge to the KMS unit (for the KMS unit to prove its identity or correctness of operation)

3. The KMS unit performs validation of the request, including any one or more of:
 a. Ensuring the credentials are correct for the requester identifier; and/or
 b. Ensuring the requester is authorized to access a key derived from the given root key identifier.

4. If not authorized, the KMS unit may be configured to return an error response and may create an audit log of the failure or take other corrective actions. If the request is authorized, the KMS unit proceeds to the next step.

5. The KMS unit processes the access request, by using the appropriate root key (either the one indicated in the request, or by inferring it from other information, such as the requester identifier) together with the blinded input to compute a blinded sub-key. For example, when using an OPRF to derive a blinded sub-key, the KMS unit may compute that blinded subkey S, as S=OPRF(root-key, B). The KMS unit may create an audit log of the successful access request. It then proceeds to the next step.

6. If a challenge was provided by the requester to the KMS unit, the KMS unit generates a response to the challenge.

7. The KMS unit returns a response to the requester including the blinded sub-key and a challenge if one was generated.

8. The requester validates the response to the challenge (if provided), and if it is valid, proceeds to unblind the sub-key using the appropriate function to unobscure the blinded sub-key and recover the OPRF output.

9. The requester uses the OPRF output as the key or to derive a key and then may perform encryption or decryption operations with that key.

In this manner, the KMS unit no longer sees the keys, and if the KMS unit cannot determine, predict, or guess the original unblinded sub-key identifiers, it has no capacity to determine any of the keys the requester receives.

Figure 4A:
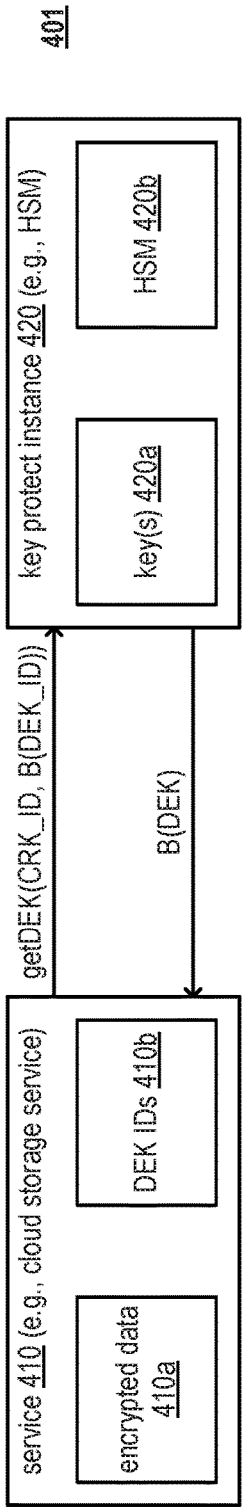
FIG. 4A is a diagram illustrating an embodiment of one or more communication systems supporting key protect with obliviousness according to various embodiments of the present invention.

FIG. 4A is a diagram illustrating an embodiment 401 of one or more communication systems supporting key protect with obliviousness according to various embodiments of the present invention. A service 410 (e.g., a cloud storage service, such as one that stores encrypted data 410*a* and Data Encryption Key (DEK) identifiers (IDs) 410*b*) and a key protect instance 410 (e.g., a Hardware Security Module (HSM) 420*b*, such as one that stores one or more keys 420*a*). The service 410 blinds a DEK ID to generate B(DEK_ID). Then, the service 410 transmits get DEK request (getDEK (CDK_ID, B(DEK_ID))) to the key protect instance 410. The key protect instance 410 processes the get DEK request (getDEK(CDK_ID, B(DEK_ID))) and returned a blinded key B(DEK).

In this implementation, there is no information about a Data Encryption Key (DEK) that is exposed by the exchange between the service 410 (e.g., a cloud storage service) and the key protect instance 410 (e.g., a Hardware Security Module (HSM)). This oblivious implemented architecture's security, unlike prior art approaches in which various components and signals are vulnerable to interception during transmission, remains secure against adversaries with unbounded computing power as no useful information is revealed through the exchange. There is no information that is vulnerable to be intercepted during this process.

With the post-quantum security of obliviousness, the exchanged messages reveal no information to the attacker. Note that even when implemented, a Transport Layer Security's (TLS's) confidentiality is made superfluous given the security provided by the novel implementation as described herein. A breached oblivious key protect instance 420 would not endanger data keys, assuming the key ids are unknown to the attacker. Data Keys (Data Encryption Keys (DEKs)) only exist and available within the boundary of the service or user recovering the key. The only change on the service side is that instead of storing wrapped DEKs, the system would simply store the DEK IDs.

Figure 4B:
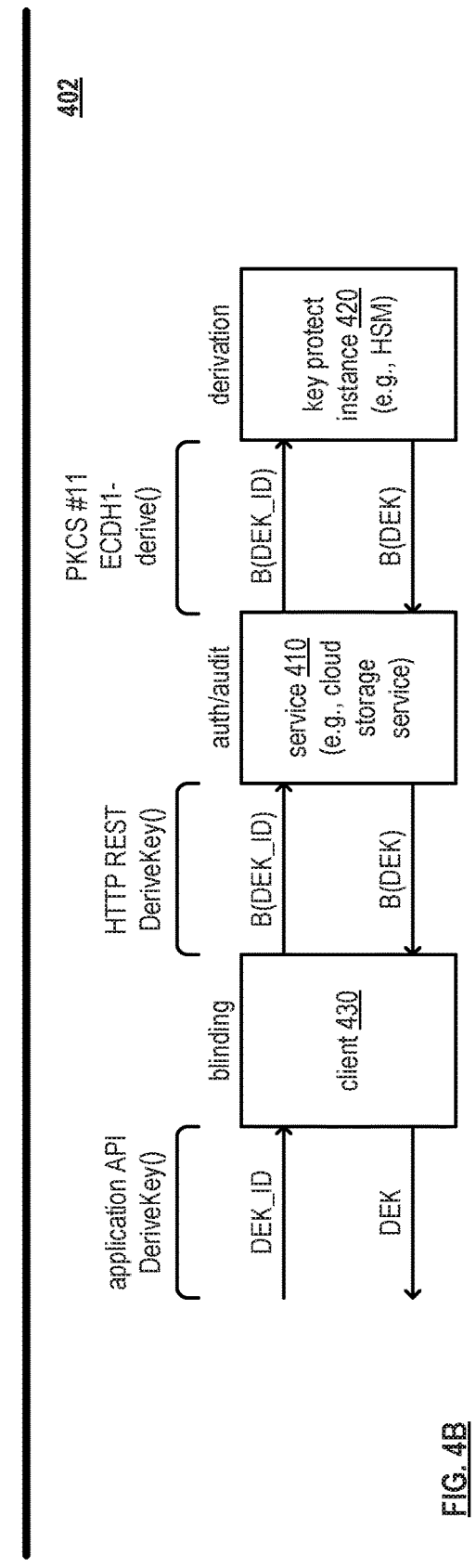
FIG. 4B is a diagram illustrating an embodiment of one or more communication systems supporting Hardware Security Module (HSM) integration according to various embodiments of the present invention.

FIG. 4B is a diagram illustrating an embodiment 402 of one or more communication systems supporting Hardware Security Module (HSM) integration according to various embodiments of the present invention. An already-implemented HSM that supports the math used in accordance with OPRFs may be readily configured to support the novel implementation as presented herein. For example, such math that is based on an Elliptic Curve operation (e.g., EC Diffie-Hellman) may be used to support such OPRFs as described herein.

For example, when the math of OPRFs is fully supported by an existing HSMs, then Customer Root Keys (CRKs) can remain within HSMs at all times and will never be exposed to the host's memory.

Referring to the diagram, an application API DeriveKey operate is supported by client 430 based on a Data Encryption Key (DEK) identifier (ID) (DEK_ID) that undergoes blinding to generate a blinded data encryption key identifier, B(DEK) that is processed via the service 410 (e.g., cloud storage service) based on service-side HTTP REST API via the key protect instance 420 (e.g., HSM) as follows:

Blinded(DEK) or B(DEK)=DeriveKey(CRK_ID, Blinded(DEK_ID))

This method takes two inputs, the customer root key identifier, CRK_ID, and the blinded data encryption key identifier, Blinded(DEK_ID)). It returns a blinded data encryption key, Blinded(DEK) or B(DEK).

With respect to the Client-side SDK API, the Data Encryption Key (DEK) is returned as follows:

DEK=DeriveKey(CRK_ID, DEK_ID)

This method takes the CRK id and the DEK id. The software development kit (SDK) code handles all blinding and de-blinding internally. It returns the DEK.

In some examples, to get obliviousness as a property, it may require some client-side preprocessing before invoking the server's API, such as followed by some post-processing of the server's result. For example, this may be done to perform the blinding and de-blinding. A client-SDK would hide all of this from the end user and present a basic interface that takes the CRK and DEK IDs and returns the corresponding DEK.

In addition, note that multi-tenancy may also be supported such that different tenants supply different CRK IDs that corresponds to a different OPRF key (e.g., different OPRF secret).

Note also that alternative, optional, and/or additional REST (RESTful, (representational state transfer)) API may be used as follows:

(CRVK-Certificate)=GetRootVerificationKey(CRK_ID)

This method takes the CRK_ID and returns a certificate for the "Customer Root Verification Key" (CRVK) corresponding to the CRK.

The certificate binds the CRKV to the CRK_ID with a digital signature

The CRVK can be used to prove returned keys are correctly computed

Blinded(DEK), Response=DeriveAndVerifyKey(CRK_ID, Blinded(DEK_ID), Challenge)

This method takes three inputs, the CRK_ID, the blinded DEK_ID, and a specially crafted "challenge". It enables the client to certify that the blinded key was computed correctly and using the correct CRK. This protects against MITM ("man in the middle," such as a middling device, etc.) attacks, server errors, defects, and memory corruption. Normally such a corruption would result in data loss such as based on encryption with a bad key. Note also that such novel solutions as presented herein can allow a client to validate that the KMS provided the correct key.

Figure 4C:
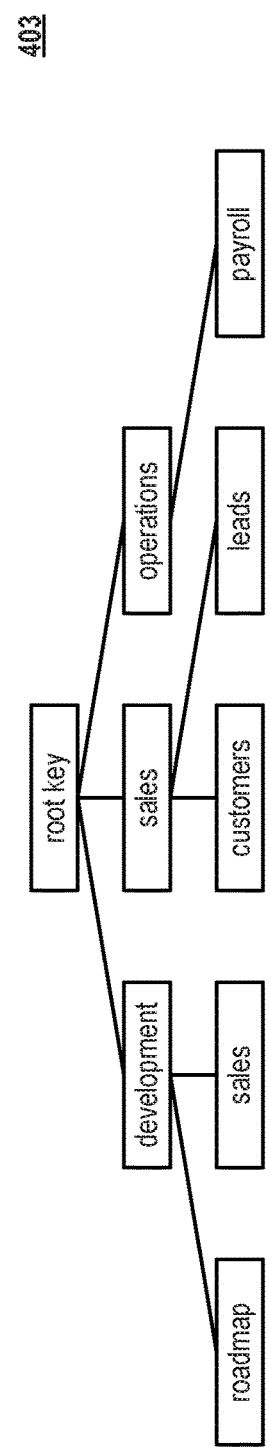
FIG. 4C is a diagram illustrating an embodiment of key hierarchies as may be used in accordance with a KMS according to various embodiments of the present invention.

FIG. 4C is a diagram illustrating an embodiment 403 of key hierarchies as may be used in accordance with a KMS according to various embodiments of the present invention. This diagram includes a hierarchy that includes a root key at a top parent level, then development, sales, and operations in a lower child level, and then roadmap and sales at a child level below development, customers and leads at a child level below sales, and payroll at a child level below operations. Each respective lower level in the hierarchy is based on any encrypted by the key associated with one or more upper levels. This enables hierarchical business cases, e.g., "Root Key" encrypts "Development Key" encrypts "Roadmap Key". For another example, "Root Key" encrypts "Sales Key" encrypts "Leads Key". Access to a parent level key grants access to lower level child keys. Note that only knowing a key not directly in the lineage doesn't allow for access to other keys not in that lineage. For example, having "Development Key" wouldn't grant access to "Payroll".

Note that implementing a hierarchy of keys requires multiple levels of wrapping. If the hierarchy is deep, this can potentially introduce performance and scaling concerns. For each level of depth in the hierarchy, the KMS may need to import another key from the database and perform another HSM operation. Note that such novel solutions as described herein with respect to servicing and operating a KMS may be applied and applicable to any type of key hierarchy including system that include only one level therein or N levels therein (where N is a positive integer greater than or equal to 2).

Figure 5:
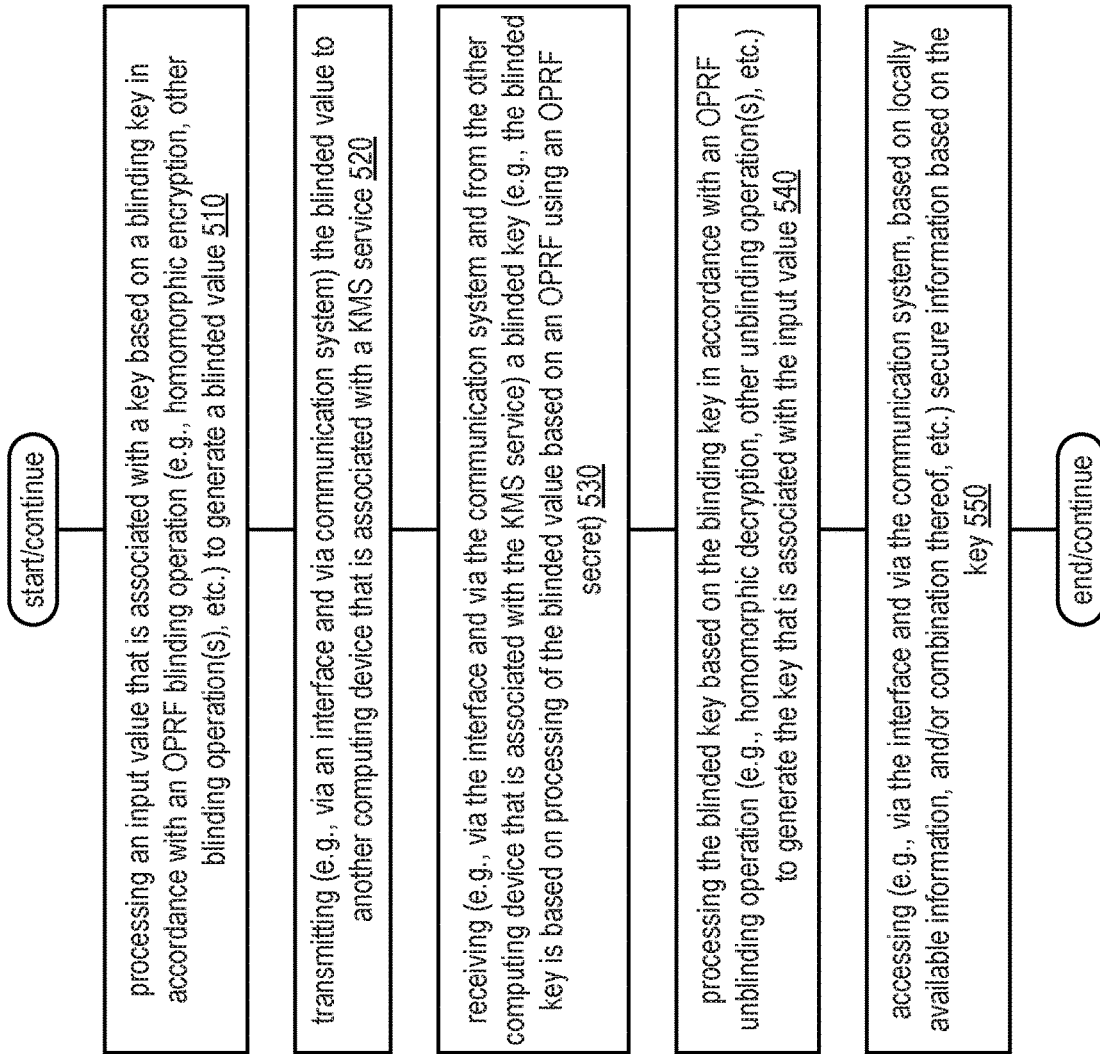
FIG. 5 is a diagram illustrating an embodiment of a method for execution by one or more computing devices according to various embodiments of the present invention.

FIG. 5 is a diagram illustrating an embodiment of a method 500 for execution by one or more computing devices according to various embodiments of the present invention. The method 500 begins in step 510 by processing an input value that is associated with a key based on a blinding key in accordance with an OPRF blinding operation (e.g., homomorphic encryption, one or more other blinding operations, etc.) to generate a blinded value. The method 500 continues in step 520 by transmitting (e.g., via an interface of the computing device that is configured to interface and communicate with a communication system) the blinded value to another computing device that is associated with a Key Management System (KMS) service.

The method 500 then operates in step 530 by receiving (e.g., via the interface and via the communication system and from the other computing device that is associated with the KMS service) a blinded key. Note that the blinded key is based on processing of the blinded value based on an Oblivious Pseudorandom Function (OPRF) using an OPRF secret. The method 500 then continues in step 540 by processing the blinded key based on the blinding key in accordance with an OPRF unblinding operation (e.g., homomorphic decryption, one or more other unblinding operations, etc.) to generate the key that is associated with the input value.

In some examples, the method 500 then operates in step 550 by accessing (e.g., via the interface and via the communication system, based on locally available information, and/or combination thereof, etc.) secure information based on the key. For example, the secure information may include secure data that is key-protected or another key that is encrypted (e.g., a wrapped key).

In some examples, the input value is unknown to the other computing device. Also, in certain specific examples, the input value includes a key identifier that is associated with the key. Also, in some examples, the key is unknown to the other computing device. In addition, in certain specific examples, the key includes a Data Encryption Key (DEK) or a Key Encryption Key (KEK). Note that the OPRF secret is unknown to the computing device and is based on a Customer Root Key (CRK) that is associated with the computing device.

Figure 6:
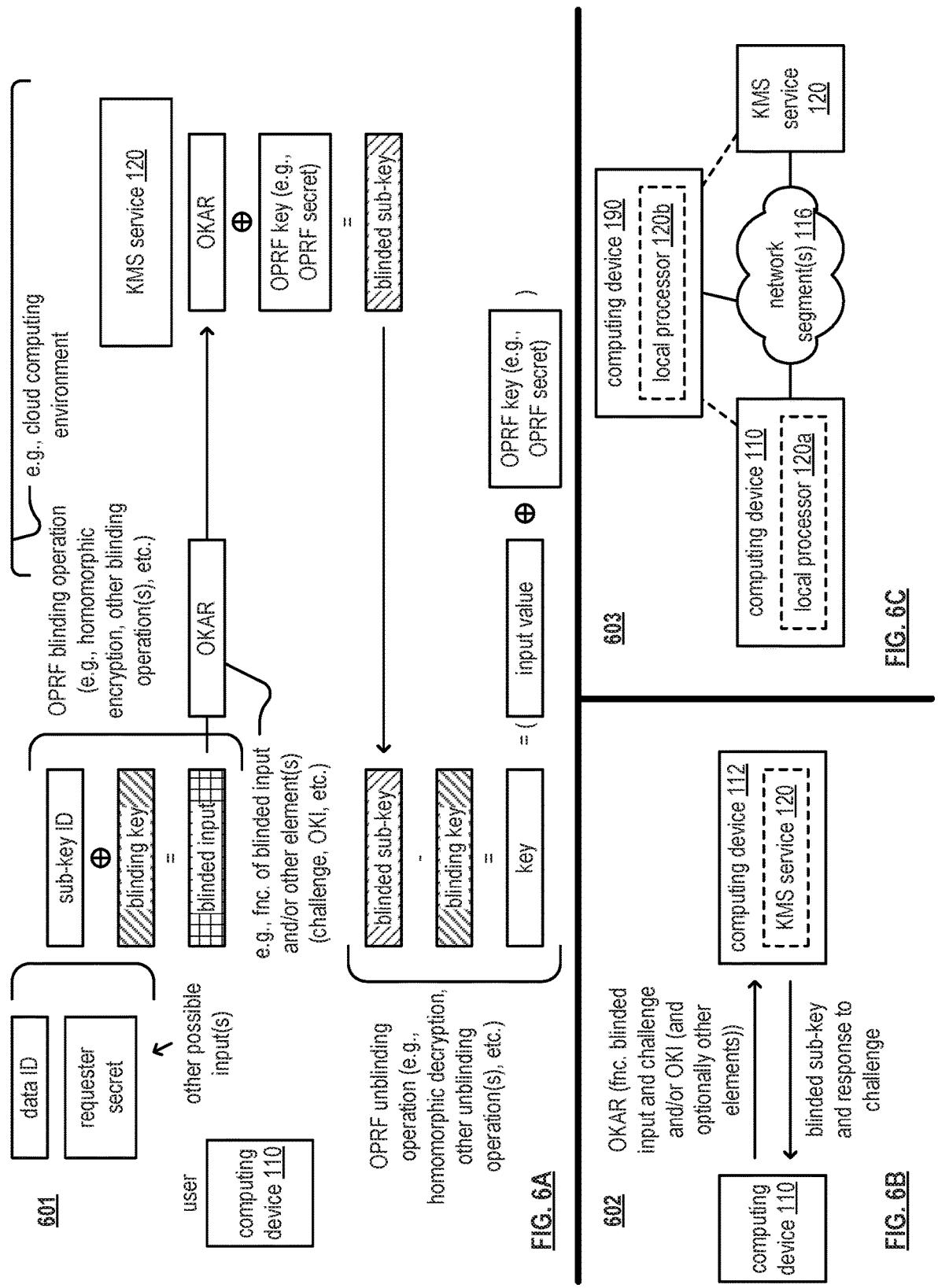
FIG. 6A is a diagram illustrating another embodiment of one or more communication systems supporting a KMS based on an OPRF according to various embodiments of the present invention.
FIG. 6B is a diagram illustrating another embodiment of one or more communication systems supporting a KMS according to various embodiments of the present invention.
FIG. 6C is a diagram illustrating another embodiment of one or more communication systems supporting a KMS according to various embodiments of the present invention.

FIG. 6A is a diagram illustrating another embodiment 601 of one or more communication systems supporting a KMS based on an OPRF according to various embodiments of the present invention. This diagram has some similarities to FIG. 3B. A computing device 110 (e.g., associated a user) is configured to generate a data identifier (ID) based at least one unique ID value associated with an encrypted data object that is encrypted based on a key. The computing device 110 then is configured to generate an input to be processed in accordance with an OPRF blinding operation (e.g., homomorphic encryption, one or more other blinding operations, etc.). In an example, the computing device 110 then is configured to generate, receive, and/or determine a sub-key ID based on the data ID and/or a requester secret and processes the sub-key ID based on a blinding key in accordance with an OPRF blinding operation (e.g., homomorphic encryption, one or more other blinding operations, etc.) to generate a blinded input.

Note that multiple different, respective, and separate values may be used as inputs to the an OPRF blinding operation (e.g., homomorphic encryption, one or more other blinding operations, etc.) to generate multiple different, respective, and separate blinded inputs. In an example, different respective blinded inputs are then provided to another computing device that is associated with a Key Management System (KMS) service (e.g., KMS service 121) to undergo different, respective, and separate OPRF operations to provide different, respective, and separate blinded sub-keys to be returned. The computing device 110 then is configured to generate an Oblivious Key Access Request (OKAR) based on the blinded input.

The computing device 110 is configured to transmit, via a communication system, the OKAR to the other computing device that is associated with a Key Management System (KMS) service (e.g., KMS service 121). The computing device 110 is configured to receive, via the communication system and from the other computing device that is associated with the KMS service (e.g., KMS 120), a blinded sub-key. Note that the blinded sub-key is based on processing of the OKAR based on an Oblivious Pseudorandom Function (OPRF) using an OPRF secret. The computing device 110 is configured to process the blinded sub-key based on the blinding key in accordance with an OPRF unblinding operation (e.g., homomorphic decryption, one or more other unblinding operations, etc.) to generate the key that is associated with the encrypted data object. In some examples, the computing device 110 is configured to process the encrypted data object based on the key.

Novel solutions as presented herein operate using various aspects of obliviousness (e.g., using OPRFs, etc. such as in accordance with a KMS). Note that the property of obliviousness can play an important role in assuring the security of keys derived from a KMS that supports oblivious key derivation. For example, when the oblivious OPRF-based KMS is blind to one or more of the inputs to the OPRF, requesters can be assured that the KMS will be unable to learn anything about their derived keys so long as at least some portion of the blinded input is unpredictable.

However, when encrypting different items, it may be preferable to use a different key for each item. For example, if the requester of the OPRF-based KMS (e.g., KMS service) uses a distinct unpredictable input for each associated key it derives, then significant memory may be required for the requester to remember each of these unpredictable inputs. Also, getting the correct unpredictable input for a given key can add an additional layer of complexity to the process. This can be improved through the realization that not all of the input needs to be unpredictable to gain the security properties of the OPRF. Instead, the input may be "partially unpredictable", and this can be done for all keys using as few as one unpredictable value.

This may be done as follows:

1. The requester of a KMS having the property of obliviousness (e.g., based on any variety of OPRF including an OPRF, a threshold OPRF (T-OPRF), a partially OPRF (P-OPRF), or a threshold, partially OPRF (TP-OPRF)) maintains at least one unpredictable value, known as a "Requester Secret: R".

2. When accessing a specific key for a piece of data (to encrypt or decrypt), a unique identifier for that encrypted data is determined. For example, this may consist of a message id, session id, file name, object identifier, URL, absolute file path, namespace, container id, offset, block number, or some combination of such values, so long as it is unique and consistent between subsequent access operations for this cipher text. The value or combination of values unique for this encrypted data is the "data ID".

3. The requester determines a "sub-key identifier" by combining the "data ID" with the requester secret "R". This can be done via any function so long as it is deterministic and includes information from both inputs, e.g., concatenation, hashing, appending, etc.

4. The requester obscures one of this inputs to a key derivation function, for example, a sub-key identifier, by using an appropriate blinding function for the OPRF that is used by the KMS unit. This produces a blinded-input "B".

5. The requester seeking to access a key sends an Oblivious Key Access Request (OKAR) to a KMS unit, the request can include any one or more of:

a. a requester identifier;

b. a root key identifier (e.g., additional information to reference a specific OPRF key);

c. a blinded input B (e.g., B=BlindingFunction(sub-key identifier));

d. authenticating information (e.g., credentials such as a password, a token, a response to a challenge, a signature, a digital certificate, etc.); and/or e. A challenge to the KMS unit (for the KMS unit to prove its identity or correctness of operation).

6. The KMS unit performs validation of the request, including any one or more of:

a. Ensuring the credentials are correct for the requester identifier; and/or b. Ensuring the requester is authorized to access a key derived from the given root key identifier.

7. If not authorized, the KMS unit returns an error response and may create an audit log of the failure or take other corrective actions. If the request is authorized, the KMS unit proceeds to the next step.

8. The KMS unit processes the access request, by using the appropriate root key (either the one indicated in the request, or by inferring it from other information, such as the requester identifier) together with the blinded input to compute a blinded sub-key. For example, when using an OPRF to derive a blinded sub-key, the KMS unit may compute that blinded subkey S, as S=OPRF(root-key, B). The KMS unit may create an audit log of the successful access request. It then proceeds to the next step.

9. If a challenge was provided by the requester to the KMS unit, the KMS unit generates a response to the challenge 10. The KMS unit returns a response to the requester including the blinded sub-key and a challenge if one was generated 11. The requester validates the response to the challenge (if provided), and if it is valid, proceeds to unblind the sub-key using the appropriate function to unobscure the blinded sub-key and recover the OPRF output.

12. The requester uses the OPRF output as the key or to derive a key and then may perform encryption or decryption operations with that key, and encrypt or decrypt the particular data item for which the key access was performed.

Note that in some cases, multiple distinct requester secrets may be used. For example, there may be a top-level requester secret, and then a sub-secret for each container which that requester has access too. In that case, the multiple requester secrets are incorporated together along with the data identifier to produce the sub-key identifier.

In this manner, the same security properties are preserved for the requester, but now the requester need to have to dedicate memory to storing an unpredictable key identifier for each key the requester needs to access.

In some scenarios, this requester secret may be maintained within a secure computing environment (e.g., a Secure Enclave, SGX, Secure Container, Hardware Security Module, Trusted Platform Module, or similar), thereby ensuring that all encryption/decryption operations must pass through an instance of that secure computing environment. This technique is especially important for those cases where the available memory within that secure computing environment is limited.

FIG. 6B is a diagram illustrating another embodiment 602 of one or more communication systems supporting a KMS according to various embodiments of the present invention. A computing device 110 is configured to interact and communicate with another computing device 112 (e.g., that is associated with or supports a KMS service 121). Such communication may be made via one or more network segments (e.g., one or more network segments 116 as described with respect to other examples and embodiments). Such one or more network segments that may be implemented based on and/or supporting cloud-based technology.

In some examples, the computing device 110 is configured to generate the OKAR based also on an OPRF key ID (OKI) that specifies the OPRF secret of a plurality of OPRF secrets of the KMS service. Also, note that the blinded key is based on processing of the OKAR based on the OPRF using the OPRF secret that is specified in the OKAR. In some examples, the OKI includes one or more of an OKI version number that indicates how fields in the OKI are represented, OPRF parameters, an OPRF public key, a result of a deterministic function applied to the OPRF public key that binds the OKI to the OPRF secret, an owner ID that specifies an owner of the OPRF secret, a validity period during which the OPRF key is valid, and/or a digital signature.

In addition, the property of obliviousness can enable a Key Management System having good security properties as described herein. Moreover, the ability to validate results returned from a KMS based on an oblivious pseudorandom function prevents malicious and unintentional corruption from leading to encrypting with invalid keys, which could lead to data loss. This invention describes how properties of the OPRF-based KMS (e.g., KMS service) may be improved by constructing key identifiers and wrapped keys in special ways.

When a requester makes a request to an OPRF-based KMS (e.g., KMS service), and if the OPRF-based KMS (e.g., KMS service) has multiple OPRF keys available, (for example, to support multiple individual requesters, or to allow requesters to utilize different keys), the requester must indicate to the OPRF-based KMS (e.g., KMS service) which OPRF key to use in the operation. The requester may indicate this to the OPRF-based KMS (e.g., KMS service) service through the inclusion a "OPRF key Identifier" (OKI) in the request.

It is possible that the OKI be generated in a trivial manner, such as a sequentially increasing number, or chosen randomly from some range of possible values. However, there are several advantages to including useful information within the OKI. For example, the OKI may be composed of several fields, including such values as:

1. An OKI version number (indicating how the fields in the OKI are represented)

2. OPRF parameters (such as what OPRF algorithm the OPRF key is for, parameters for it (e.g., which elliptic curve, what RSA key size, etc.) and what blinding procedure to use)

3. OPRF public key or the result of a deterministic function applied to the OPRF public key (e.g., the SHA-256 hash of the OPRF public key) which strongly binds the OKI to the particular OPRF key.

4. Owner Identifier—which associates the "owner" of the OPRF key with the OPRF key in question 5. Validity Period—At least one time range (e.g., a start and end time) for which the OPRF key is valid 6. Digital Signature—This may be included to make the validity of the fields in the OKI self-authenticating, by having the fields digitally signed and including the resulting signature as part of the OKI.

The inclusion of these fields in the OKI can simplify the operation of requesters, which need only be configured with the OKI. The requester would check for the presence of these fields and use them as follows:

1. First the requester would check the OKI version number, and ensure that the version number is one that is supported by the requester, and then according to the version number, determine how to parse the other fields included in the OKI 2. When the OPRF parameters are included, this informs the requester of what mathematical and cryptographic operations need to be applied to the OPRF input to form the blinded input.

3. When the OPRF public key is included, the requester may use this to perform a validation of the result returned from the OPRF-based KMS (e.g., KMS service). If instead of the OPRF public key, the result of a deterministic function applied to the OPRF public key is included, the requester may request the OPRF public key from the OPRF-based KMS (e.g., KMS service). The requester can then apply the deterministic function to this received OPRF public key and compare it to the result within the OKI. If they match, this provides strong confidence to the requester of the correctness of the received OPRF public key, and enables the requester to perform validation of the OPRF result obtained from the OPRF-based KMS (e.g., KMS service).

4. If the owner identifier is included, the requester asserts that the owner identifier compares favorably to the requester's expectation. For example, the requester may check that the owner identifier is a member of a set of expected owner identifiers.

5. If a validity period is included, the requester may check that the current time happens to fall within one of the included validity periods. If the current time does not fall within one of the provided validity periods, the requester will abort any attempt to use the OPRF key, or may refuse to use it for the generation/derivation of new keys.

6. If a digital signature is included, the requester can use the public key or digital certificate of the signer to authenticate the rest of the fields in the OKI. If the signature compares favorably the requester accepts the OKI. However, if the signature does not compare favorably the requester will reject the OKI as invalid.

Additional utility can be added to "Supporting Key Wrap and Unwrap Semantics in a OPRF-based Key Management System" through the inclusion of additional fields within the combined result "C". In the original case, "C" contained two values:

1. A random value "R"
2. A wrapped key "W"

However, including other fields in the combined result, offers several benefits. Some additional values which may be included in the combined result "C" include:

3. Check Value—A hash, checksum, signature, or authentication tag (e.g., when using authenticated encryption to wrap the key) of the key, the wrapped key, or the OPRF output or other values derived from the OPRF output.

4. The OKI for which the wrapped key is associated

5. Key Usages—i.e. for what purposes and applications can this key be used for. Example key usages include: signing, encrypting, key wrapping, data encryption, encryption only, decryption only, key agreement, cert signing, and CRL signing.

6. Validity Period—At least one-time range (e.g., a start and end time) for which the key is valid The requester, upon using the C value to recover a key using the "unwrap" operation, will parse C into the various fields which compose it, to obtain "R", "W", and optionally the other values such as the "Check Value", the "OKI", "Key Usages", and "Key Validity Period". The requester can then use the check value to verify the proper recovery of the key, perhaps in a manner that is less expensive than using the method described in "Validating Keys Derived from an Oblivious Pseudorandom Function", the requester can also use the key usages and validity period to make informed decisions as to what operations are allowed for the key, and under what time frames. For example, outside the validity period, the key might no longer be allowed to encrypt new information (only to decrypt previously encrypted information).

FIG. 6C is a diagram illustrating another embodiment 603 of one or more communication systems supporting a KMS according to various embodiments of the present invention. A computing device 110 is configured to interact and communicate with another computing device 112 (e.g., that is associated with or supports a KMS service 121). In addition, the computing device 110 is optionally in communication with one or more other computing device (e.g., computing device 190) via one or more network segments 116. Such communication may be made via the one or more network segments 116 that may be implemented based on and/or supporting cloud-based technology. The property of "Obliviousness" can enable a Key Management System having good security properties. Note that a "local processor" may be implemented as one or both of local processor 120a within computing device 110 and/or local processor 120b within computing device 190. In some examples, one or both of these local processors 120a, 120b operate as an interface to support calls to wrap or unwrap encryption keys made by requesters (e.g., from the computing device 110).

However, an OPRF-based KMS (e.g., KMS service) may have certain limitations in some implementations:

1. It does not support wrapping (encrypting) existing keys
2. It does not support unwrapping (decrypting) previously wrapped keys
3. Its operation and semantics of use differ from those of KMSs that support wrap/unwrap functionality.
4. The OPRF does not accommodate keys that already exist (as the output is unpredictable and cannot be controlled)

However, by having the requester perform some additional steps prior to and before interacting with the OPRF-based KMS (e.g., KMS service), the requester can mimic the functionality and semantics of a KMS supporting wrap/unwrap functions, and therefore accommodate pre-existing keys using this semantic.

To support wrap and unwrap operations when using an OPRF-based KMS (e.g., KMS service), a "local Processor" (LP)(e.g., shown as local processor 120a within computing device 110 and/or local processor 120b within computing device 190) provides the interface for supporting calls to wrap or unwrap encryption keys made by requesters. The LP itself interacts with the OPRF-based KMS (e.g., KMS service) to complete these operations. The LP implements supports at least two operations:

1. WrapKey—This operation takes at least one parameter, a Key "K" to wrap. Optionally it may take additional parameters, such as an identifier "ID" for which OPRF key to use. This operation, upon success returns a Wrapped-Key "W"

2. UnwrapKey—This operation takes at least one parameter, the Wrapped-Key W to unwrap. Optionally it may take additional parameters, such as an identifier "ID" for which OPRF key to use. This operation, upon success returns the unwrapped key K.

Abstracted as functions, the method could look like:
W=WrapKey(ID, K)
K=UnwrapKey(ID, W)

Where for any encryption key "K" that is wrapped into a wrapped key "W", the unwrapping of that W will yield the same K. To implement the wrapping operation, the LP performs the following steps when provided a key to be wrapped:

1. The LP generates a random value "R"
2. The LP uses the OPRF-based KMS (e.g., KMS service) to derive an encryption key "E" using R as the "sub-key identifier". If an ID was provided, the LP will use it to select the root key identifier when interacting with the OPRF-based KMS (e.g., KMS service) (e.g., KMS service)).
3. The LP uses the encryption key E to encrypt the provided key "K", this yields the wrapped key W 4. The LP combines both R and W together in a way that is reversible (e.g., both R and W can be recovered in the future from this combined value, e.g., concatenation, appending, prepending, interlacing, etc.). This combined value is "C"

5. The LP returns "C" to the requester to serve as the wrapped key, though it actually includes both the wrapped key W and the random value.

To implement the unwrapping operation, the LP performs the following steps when provided a key to be unwrapped:

1. The LP receives "C" as the wrapped key to be unwrapped to produce K

2. The LP decombines (e.g., parses) C into its two constituent values: R and W

3. The LP uses the OPRF-based KMS (e.g., KMS service) (e.g., KMS service)) to derive a decryption key D (note that this D will equal E from the original wrap operation) using R as the "sub-key identifier". If an ID was provided, the LP will use it to select the root key identifier when interacting with the OPRF-based KMS (e.g., KMS service) (e.g., KMS service)).

4. The LP uses D to decrypt W, to produce the unwrapped key K

5. The LP returns K to the requester as the unwrapped key.

Note that in some cases, additional information may be returned by the OPRF-based KMS (e.g., KMS service) (e.g., KMS service). For example, an indication that the returned key ought to be re-wrapped. This additional information may be passed through from the LP to the requester. The requester can then choose to respond accordingly to that information, for example to re-wrap the key when the additional information indicates that the key should be re-wrapped.

Figure 7:
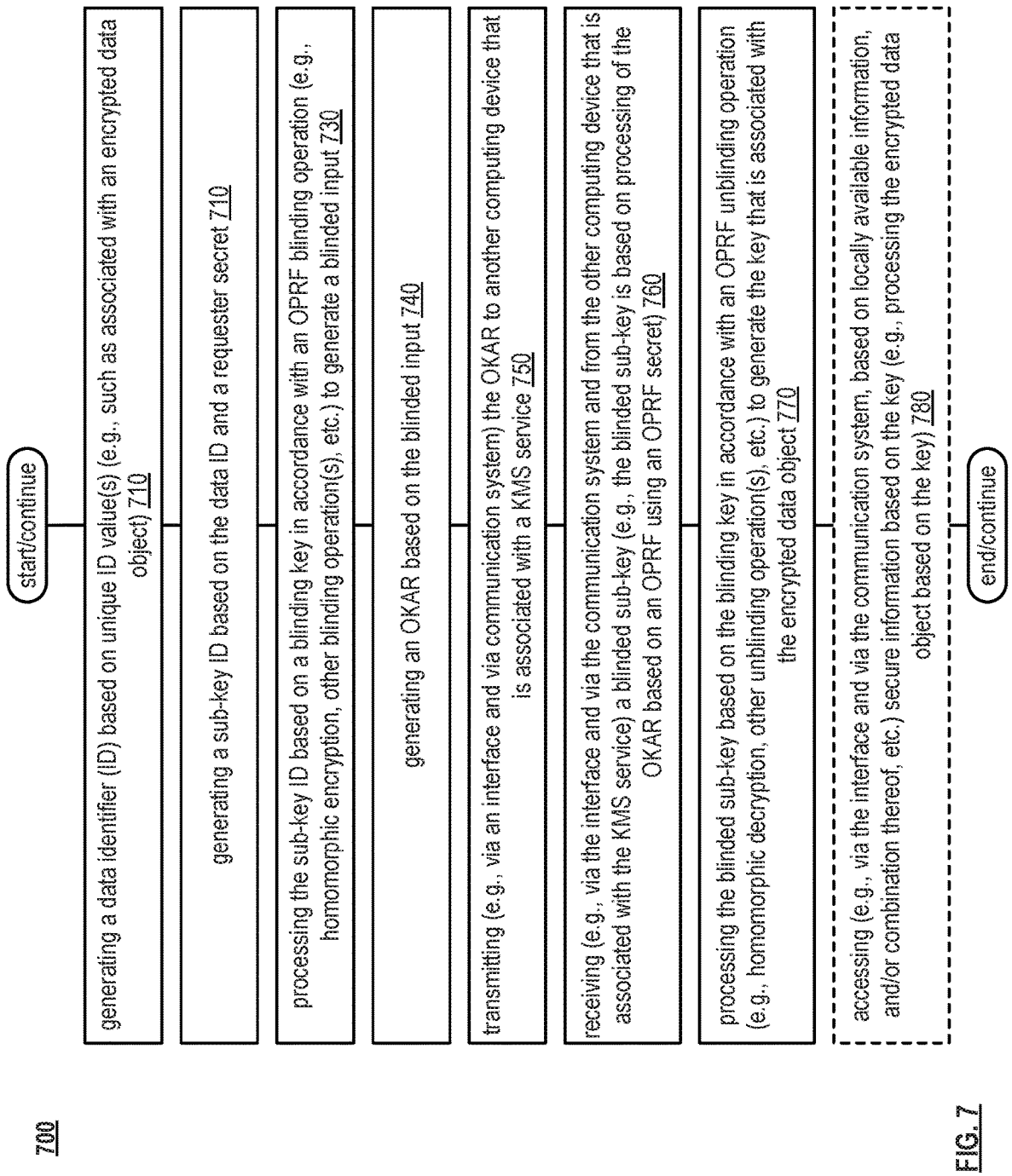
FIG. 7 is a diagram illustrating an embodiment of a method for execution by one or more computing devices according to various embodiments of the present invention.

FIG. 7 is a diagram illustrating an embodiment of a method 700 for execution by one or more computing devices according to various embodiments of the present invention. The method 700 operates in step 710 by generating a data identifier (ID) based at least one unique ID value (e.g., such as associated with an encrypted data object that is encrypted based on a key). The method 700 then continues in step 720 by generating a sub-key ID based on the data ID and a requester secret. The method 700 also operates in step 730 by processing the sub-key is based on a blinding key in accordance with an OPRF blinding operation (e.g., homomorphic encryption, one or more other blinding operations, etc.) to generate a blinded input. The method 700 continues in step 740 by generating an Oblivious Key Access Request (OKAR) based on the blinded input.

The method 700 then operates in step 750 by transmitting (e.g., via an interface of a computing device that is configured to interface and communicate with a communication system and via the communication system) the OKAR to another computing device that is associated with a Key Management System (KMS) service.

The method 700 continues in step 760 by receiving a blinded sub-key (e.g., via the interface and via the communication system and from the other computing device that is associated with the KMS service). Note that the blinded sub-key is based on processing of the OKAR based on an Oblivious Pseudorandom Function (OPRF) using an OPRF secret. The method 700 then operates in step 770 by processing the blinded sub-key based on the blinding key in accordance with an OPRF unblinding operation (e.g., homomorphic decryption, one or more other unblinding operations, etc.) to generate the key that is associated with the encrypted data object. The method 700 continues in step 780 by accessing (e.g., via the interface and via the communication system, based on locally available information, and/or combination thereof, etc.) secure information based on the key. For example, this may involve using this key in accordance with processing an encrypted data object that is encrypted based on the key. This may involve processing secure information using the key. For example, secure information may be accessed based on the key (e.g., such as the secure information being stored remotely in one or more other devices within the communication system and accessing that secure information via the interface and via the communication system). Alternatively, this may involve encrypting data using the key, and/or decrypting encrypted data using the key. In general, any of a variety of operations may be made using the key in accordance with operations related to secure information.

Figure 8:
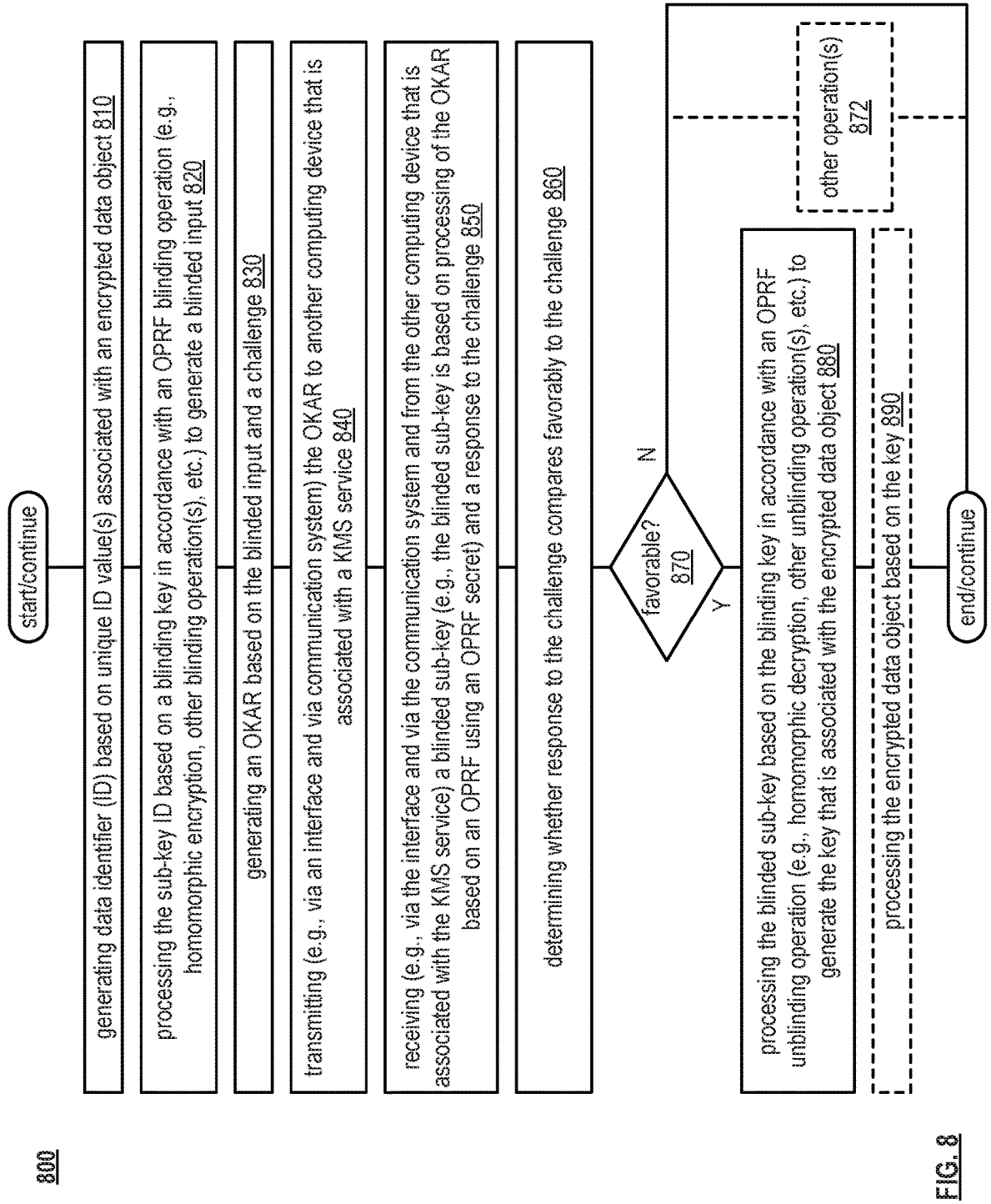
FIG. 8 is a diagram illustrating another embodiment of a method for execution by one or more computing devices according to various embodiments of the present invention.

FIG. 8 is a diagram illustrating another embodiment of a method 800 for execution by one or more computing devices according to various embodiments of the present invention. The method 800 operates in step 810 by generating a data identifier (ID) based at least one unique ID value associated with an encrypted data object that is encrypted based on a key. The method 800 then continues in step 820 by generating a sub-key ID based on the data ID and a requester secret. The method 800 also operates in step 830 by processing the sub-key is based on a blinding key in accordance with an OPRF blinding operation (e.g., homomorphic encryption, one or more other blinding operations, etc.) to generate a blinded input. The method 800 continues in step 840 by generating an Oblivious Key Access Request (OKAR) based on the blinded input and a challenge.

The method 800 then operates in step 850 by transmitting (e.g., via an interface of a computing device that is configured to interface and communicate with a communication system and via the communication system) the OKAR to another computing device that is associated with a Key Management System (KMS) service.

The method 800 continues in step 860 by receiving a blinded sub-key and a response to the challenge (e.g., via the interface and via the communication system and from the other computing device that is associated with the KMS service). Note that the blinded sub-key is based on processing of the OKAR based on an Oblivious Pseudorandom Function (OPRF) using an OPRF secret. The method 800 then operates in step 870 by determining whether the response to the challenge compares favorably to the challenge.

Based on a determination that the response to the challenge compares favorably to the challenge, the method 800 operates in step 880 by processing the blinded sub-key based on the blinding key in accordance with an OPRF unblinding operation (e.g., homomorphic decryption, one or more other unblinding operations, etc.) to generate the key that is associated with the encrypted data object. In some examples, the method 800 continues in step 880 by processing the encrypted data object based on the key. In some examples, this involves accessing (e.g., via the communication system) secure information based on the key. Alternatively, based on a determination that the response to the challenge compares unfavorably to the challenge, the method 800 ends or operates in step 872 by performing one or more other operations (e.g., generating an error message, sending the error message to one or more computing devices, etc.).

Figure 9:
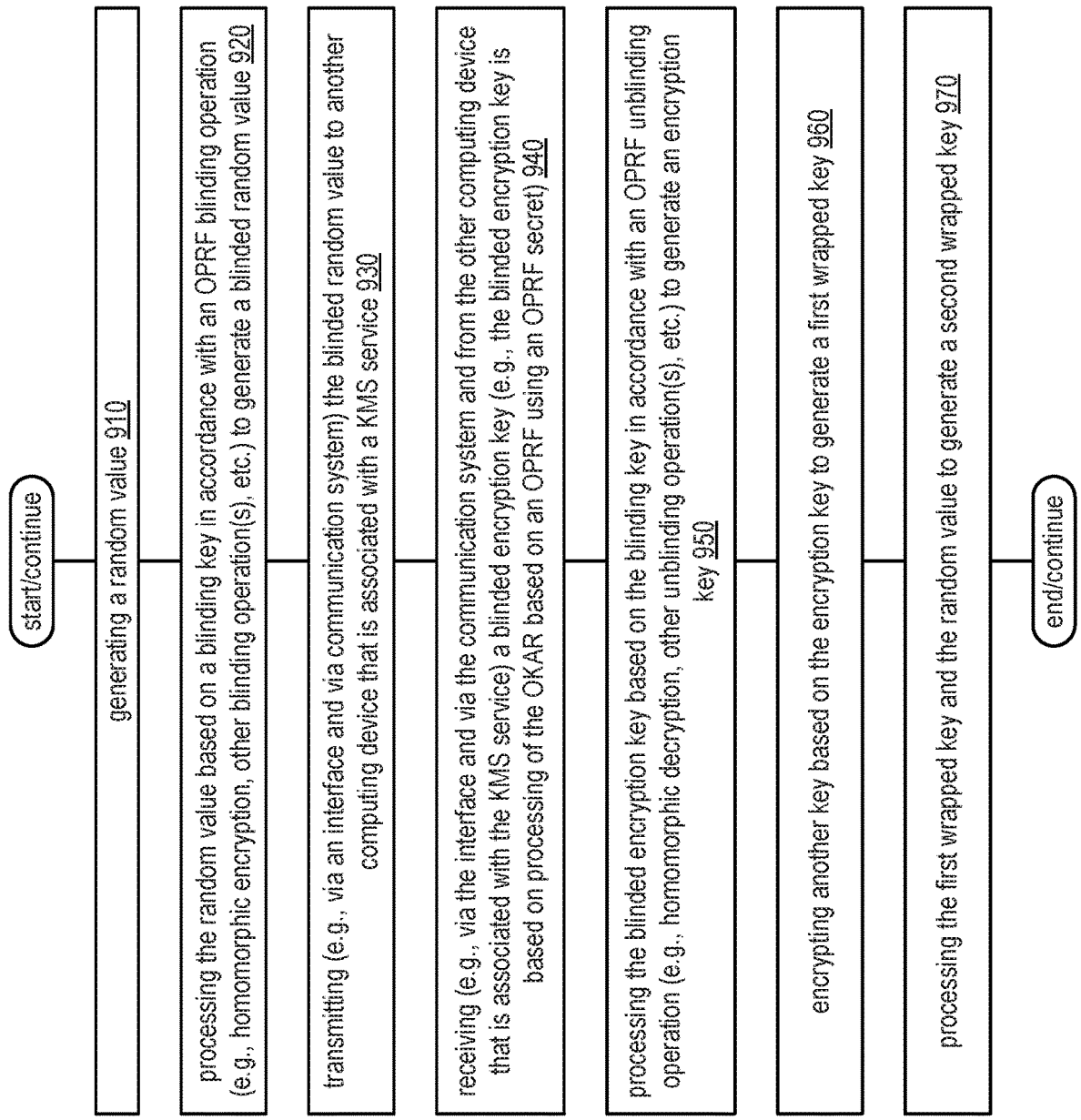
FIG. 9 is a diagram illustrating another embodiment of a method for execution by one or more computing devices according to various embodiments of the present invention.

FIG. 9 is a diagram illustrating another embodiment of a method 900 for execution by one or more computing devices according to various embodiments of the present invention. The method 900 operates in step 910 by generating a random value. The method 900 then continues in step 920 by processing the random value based on another blinding key in accordance with an OPRF blinding operation (e.g., homomorphic encryption, one or more other blinding operations, etc.) to generate a blinded random value.

The method 900 also operates in step 930 by transmitting (e.g., via an interface of the computing device and via a communication system) the blinded random value to the other computing device that is associated with the KMS service.

The method 900 also operates in step 940 by receiving (e.g., via the interface and via the communication system and from the other computing device) that is associated with the KMS service, a blinded encryption key, wherein the blinded encryption key is based on processing of the blinded random value based on the OPRF using another OPRF secret.

The method 900 continues in step 950 by processing the blinded encryption key based on the other blinding key in accordance with an OPRF unblinding operation (e.g., homomorphic decryption, one or more other unblinding operations, etc.) to generate an encryption key. The method 900 then operates in step 960 by encrypting another key based on the encryption key to generate a first wrapped key. The method 900 then continues in step 970 by processing the first wrapped key and the random value to generate a second wrapped key.

Figure 10:
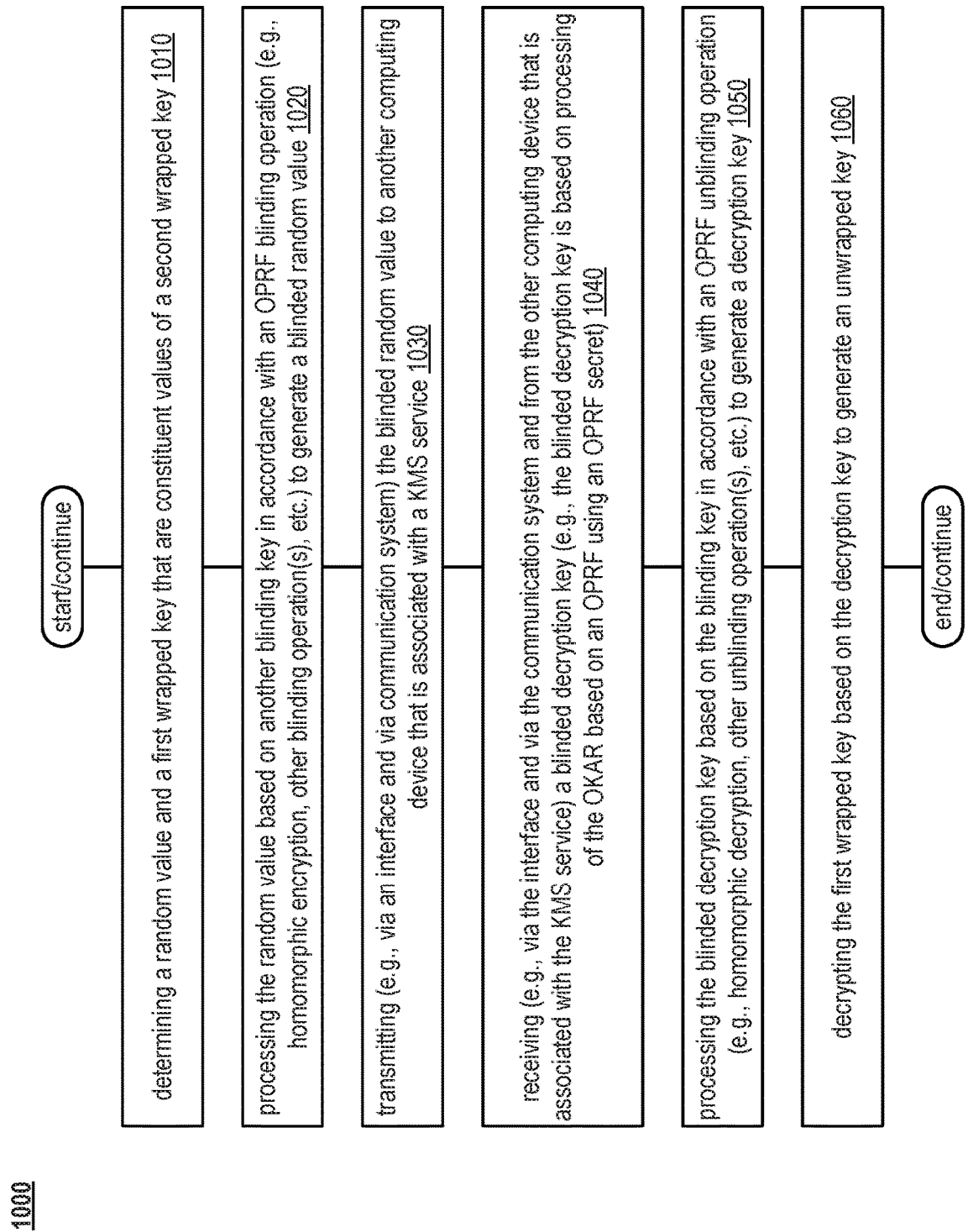
FIG. 10 is a diagram illustrating another embodiment of a method for execution by one or more computing devices according to various embodiments of the present invention.

FIG. 10 is a diagram illustrating another embodiment of a method 1000 for execution by one or more computing devices according to various embodiments of the present invention. The method 1000 operates in step 1010 by determining a random value and a first wrapped key that are constituent values of a second wrapped key. The method 1000 then continues in step 1020 by processing the random value based on another blinding key in accordance with an OPRF blinding operation (e.g., homomorphic encryption, one or more other blinding operations, etc.) to generate a blinded random value.

The method 1000 also operates in step 1030 by transmitting (e.g., via an interface of a computing device and via the communication system) the blinded random value to the other computing device that is associated with the KMS service.

The method 1000 continues in step 1040 by receiving (e.g., via the interface and via the communication system and from the other computing device that is associated with the KMS service) a blinded decryption key, wherein the blinded decryption key is based on processing of the blinded random value based on the OPRF using another OPRF secret.

The method 1000 then operates in step 1050 by processing the blinded decryption key based on the other blinding key in accordance with an OPRF unblinding operation (e.g., homomorphic decryption, one or more other unblinding operations, etc.) to generate a decryption key. The method 1000 continues in step 1060 by decrypting the first wrapped key based on the decryption key to generate an unwrapped key. In addition, in some examples, one or more additional operations, steps, etc. is/are performed to verify or validate that the unwrapped key was successfully and properly recovered. For example, operations based on authenticated encryption may be used. This may involve comparing the decrypted result (e.g., the unwrapped key) may be compared to an expected decrypted result (e.g., e.g., of what the unwrapped key is expected to be) to determine whether they compare favorably. Alternatively, a stored hash of the expected decrypted result may be compared to a re-computed hash of the decrypted result (e.g., a re-computed hash of the unwrapped key) to determine whether they compare favorably. A favorably comparison then corresponds to a validation or verification that the unwrapped key was successfully and properly recovered. An unfavorably comparison then corresponds to a validation or verification that the unwrapped key was not successfully and properly recovered.

Figure 11:
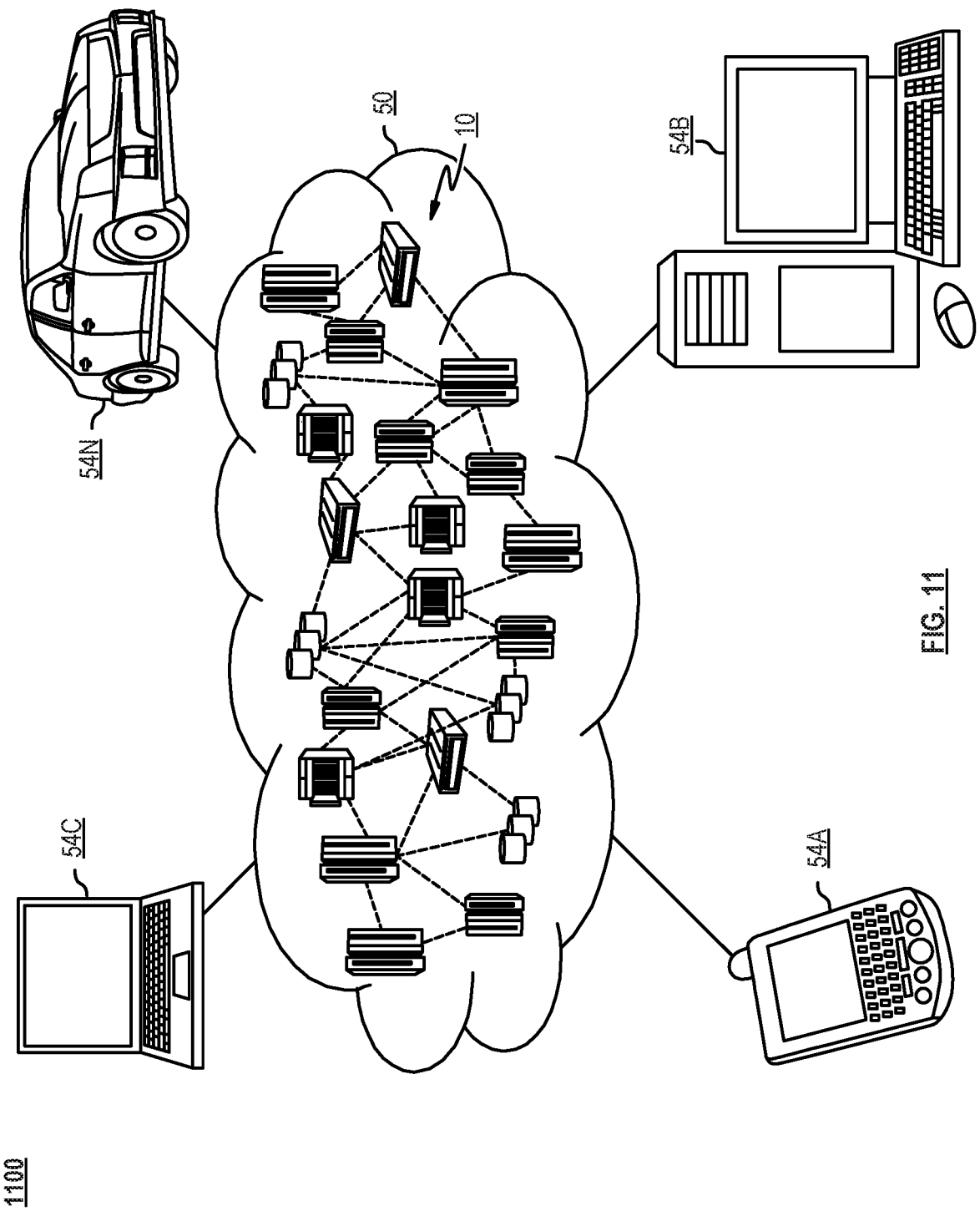
FIG. 11 depicts a cloud computing environment according to various embodiments of the present invention.

FIG. 11 depicts a cloud computing environment 1100 according to various embodiments of the present invention. FIG. 11 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
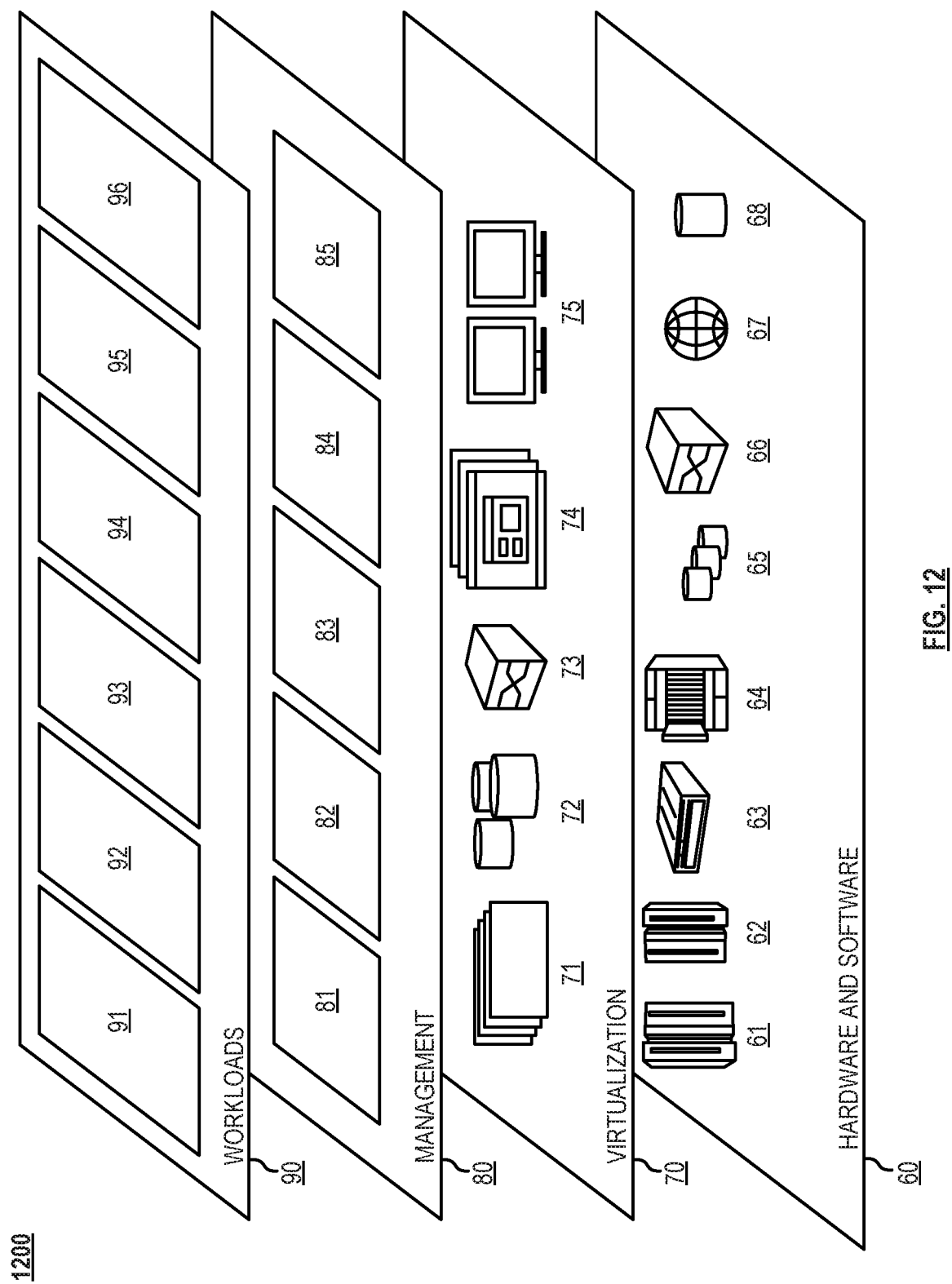
FIG. 12 depicts abstraction model layers according to various embodiments of the present invention.

FIG. 12 depicts abstraction model layers 600 according to various embodiments of the present invention. Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 1301 of FIG. 13.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and key identifiers (IDs) for use in accordance with operations based on communication system and communications related to one or more Key Management Systems (KMSs) that operates based on one or more Oblivious Pseudorandom Functions (OPRFs) 96.

Figure 13:
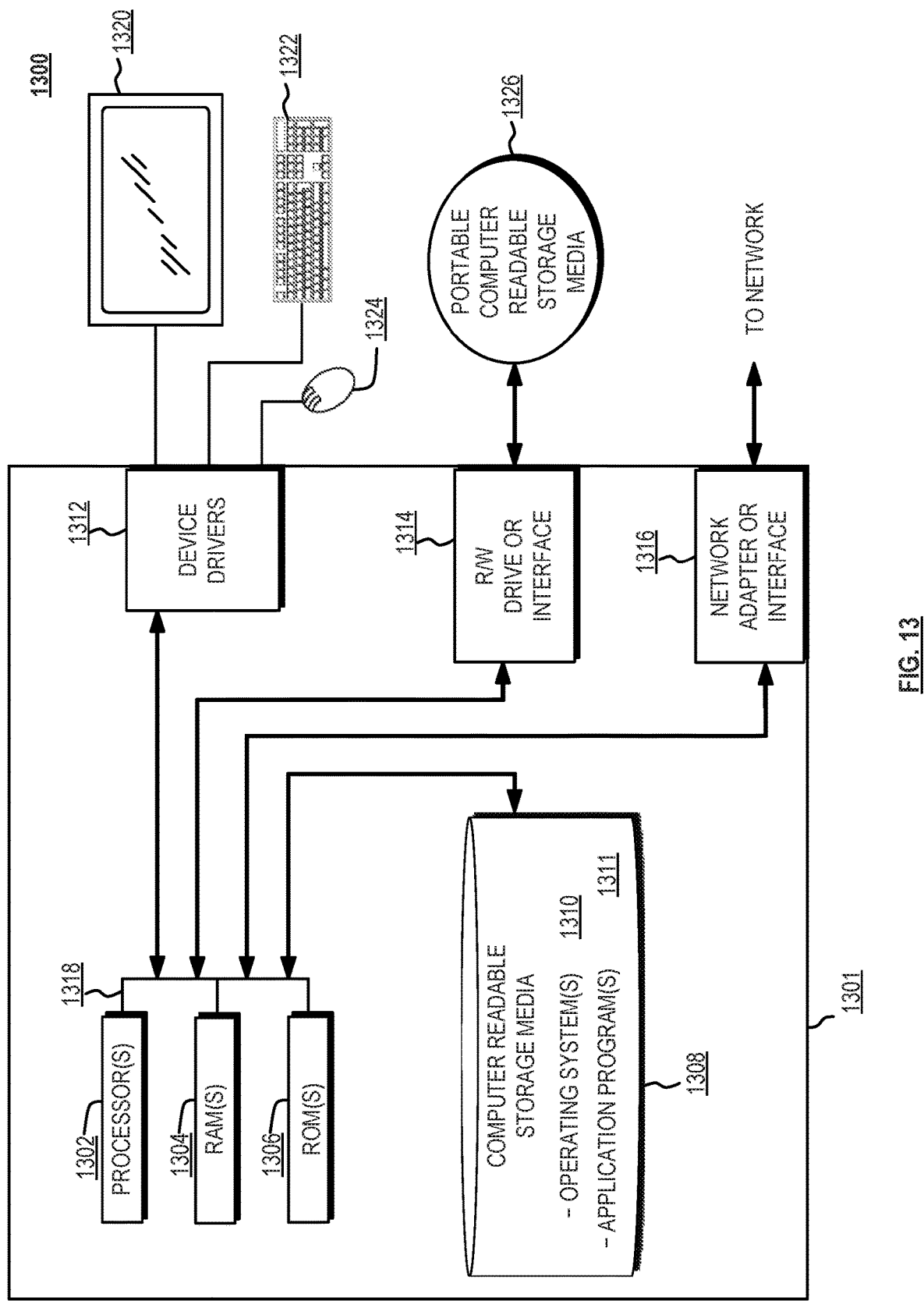
FIG. 13 depicts a block diagram of a computing device according to various embodiments of the present invention.

FIG. 13 depicts a block diagram 1300 of a computing device according to various embodiments of the present invention. FIG. 13 depicts a block diagram of components of a computing device 1301, which can be utilized to implement some or all of the cloud computing nodes 10, some or all of the computing devices 54A-N of FIG. 11, and/or to implement other computing devices described herein in accordance with an embodiment of the present invention. It should be appreciated that FIG. 13 provides only an illustration of one implementation and does not imply any limitations with regard to the environments in which different embodiments may be implemented. Many modifications to the depicted environment may be made.

Computing device 1301 can include one or more processors 1302, one or more computer-readable RAMs 1304, one or more computer-readable ROMs 1306, one or more computer readable storage media 1308, device drivers 1312, read/write drive or interface 1314, and network adapter or interface 1316, all interconnected over a communications fabric 1318. Communications fabric 1318 can be implemented with any architecture designed for passing data and/or control information between processors (such as microprocessors, communications and network processors, etc.), system memory, peripheral devices, and any other hardware components within the system.

One or more operating systems 1310 and/or application programs 1311, such as network application server software 67 and database software 68 of FIG. 12, are stored on one or more of the computer readable storage media 1308 for execution by one or more of the processors 1302 via one or more of the respective RAMs 1304 (which typically include cache memory). In the illustrated embodiment, each of the computer readable storage media 1308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 1301 can also include a R/W drive or interface 1314 to read from and write to one or more portable computer readable storage media 1326. Application programs 1311 on computing devices 1301 can be stored on one or more of the portable computer readable storage media 1326, read via the respective R/W drive or interface 1314 and loaded into the respective computer readable storage media 1308.

Computing device 1301 can also include a network adapter or interface 1316, such as a TCP/IP adapter card or wireless communication adapter. Application programs 1311 on computing devices 54A-N can be downloaded to the computing device from an external computer or external storage device via a network (for example, the Internet, a local area network or other wide area networks or wireless networks) and network adapter or interface 1316. From the network adapter or interface 1316, the programs may be loaded into the computer readable storage media 1308. The network may comprise copper wires, optical fibers, wireless transmission, routers, firewalls, switches, gateway computers and edge servers.

Computing device 1301 can also include a display screen 1320, a keyboard or keypad 1322, and a computer mouse or touchpad 1324. Device drivers 1312 interface to display screen 1320 for imaging, to keyboard or keypad 1322, to computer mouse or touchpad 1324, and/or to display screen 1320 for pressure sensing of alphanumeric character entry and user selections. The device drivers 1312, R/W drive or interface 1314, and network adapter or interface 1316 can comprise hardware and software stored in computer readable storage media 1308 and/or ROM 1306.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a communication system;
memory that stores operational instructions; and
processing circuitry operably coupled to the interface and to the memory, wherein the processing circuitry is configured to execute the operational instructions to:
generate a data identifier (ID) based at least one unique ID value associated with an encrypted data object that is encrypted based on a key;
generate a sub-key ID based on the data ID and a requester secret;
process the sub-key ID based on a blinding key in accordance with an Oblivious Pseudorandom Function (OPRF) blinding operation to generate a blinded input;
generate an Oblivious Key Access Request (OKAR) based on the blinded input;
transmit, via the communication system, the OKAR to another computing device that is associated with a Key Management System (KMS) service;
receive, via the communication system and from the another computing device that is associated with the KMS service, a blinded sub-key, wherein the blinded sub-key is based on processing of the OKAR based on an Oblivious Pseudorandom Function (OPRF) using an OPRF secret;
process the blinded sub-key based on the blinding key in accordance with an OPRF unblinding operation to generate the key that is associated with the encrypted data object; and
access secure information based on the key.

2. The computing device of claim 1, wherein the processing circuitry is further configured to execute the operational instructions to:
generate the OKAR based on the blinded input and based on a challenge to be used by the KMS service to verify at least one of identity of the KMS service or correctness of operation of the KMS service;

receive, via the communication system and from the another computing device that is associated with the KMS service, the blinded sub-key and a response to the challenge;

determine whether the response to the challenge compares favorably to the challenge; and based on a determination that the response to the challenge compares favorably to the challenge, process the blinded sub-key based on the blinding key in accordance with the OPRF unblinding operation to generate the key that is associated with the encrypted data object.

3. The computing device of claim 1, wherein the processing circuitry is further configured to execute the operational instructions to:

generate a random value;

process the random value based on another blinding key in accordance with the OPRF blinding operation to generate a blinded random value;

transmit, via the communication system, the blinded random value to the another computing device that is associated with the KMS service;

receive, via the communication system and from the another computing device that is associated with the KMS service, a blinded encryption key, wherein the blinded encryption key is based on processing of the blinded random value based on the OPRF using another OPRF secret;

process the blinded encryption key based on the another blinding key in accordance with the OPRF unblinding operation to generate an encryption key;

encrypt another key based on the encryption key to generate a first wrapped key; and process the first wrapped key and the random value to generate a second wrapped key.

4. The computing device of claim 1, wherein the processing circuitry is further configured to execute the operational instructions to:

determine a random value and a first wrapped key that are constituent values of a second wrapped key;

process the random value based on another blinding key in accordance with the OPRF blinding operation to generate a blinded random value;

transmit, via the communication system, the blinded random value to the another computing device that is associated with the KMS service;

receive, via the communication system and from the another computing device that is associated with the KMS service, a blinded decryption key, wherein the blinded decryption key is based on processing of the blinded random value based on the OPRF using another OPRF secret;

process the blinded decryption key based on the another blinding key in accordance with the OPRF unblinding operation to generate a decryption key; and decrypt the first wrapped key based on the decryption key to generate an unwrapped key.

5. The computing device of claim 1, wherein the processing circuitry is further configured to execute the operational instructions to:

generate the OKAR based also on an OPRF key ID (OKI) that specifies the OPRF secret of a plurality of OPRF secrets of the KMS service, wherein the blinded key is based on processing of the OKAR based on the OPRF using the OPRF secret that is specified in the OKAR.

6. The computing device of claim 5, wherein the OKI includes at least one of:

an OKI version number that indicates how fields in the OKI are represented;

OPRF parameters;

an OPRF public key;

a result of a deterministic function applied to the OPRF public key that binds the OKI to the OPRF secret;

an owner ID that specifies an owner of the OPRF secret;

a validity period during which the OPRF key is valid; or a digital signature.

7. The computing device of claim 1, wherein at least one of:

the computing device includes a wireless smart phone, a cellular phone, a laptop, a personal digital assistant, a tablet, a personal computers (PC), a work station, or a video game device; or the another computing device includes a Hardware Security Module (HSM).

8. The computing device of claim 1, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

9. A computing device comprising:

an interface configured to interface and communicate with a communication system;

memory that stores operational instructions; and processing circuitry operably coupled to the interface and to the memory, wherein the processing circuitry is configured to execute the operational instructions to:

generate a data identifier (ID) based at least one unique ID value associated with an encrypted data object that is encrypted based on a key;

generate a sub-key ID based on the data ID and a requester secret;

process the sub-key ID based on a blinding key in accordance with an Oblivious Pseudorandom Function (OPRF) blinding operation to generate a blinded input;

generate an Oblivious Key Access Request (OKAR) based on the blinded input, an OPRF key ID (OKI) that specifies an Oblivious Pseudorandom Function (OPRF) secret of a plurality of OPRF secrets of a Key Management System (KMS) service, and a challenge to be used by the KMS service to verify at least one of identity of the KMS service or correctness of operation of the KMS service;

transmit, via the communication system, the OKAR to another computing device that is associated with the KMS service;

receive, via the communication system and from the another computing device that is associated with the KMS service, a blinded sub-key and a response to the challenge, wherein the blinded sub-key is based on processing of the OKAR based on the OPRF using the OPRF secret that is specified in the OKAR;

determine whether the response to the challenge compares favorably to the challenge;

based on a determination that the response to the challenge compares favorably to the challenge, process the blinded sub-key based on the blinding key in accordance with an OPRF unblinding operation to generate the key that is associated with the encrypted data object; and access secure information based on the key.

10. The computing device of claim 9, wherein the processing circuitry is further configured to execute the operational instructions to:
generate a random value;
process the random value based on another blinding key in accordance with the OPRF blinding operation to generate a blinded random value;
transmit, via the communication system, the blinded random value to the another computing device that is associated with the KMS service;
receive, via the communication system and from the another computing device that is associated with the KMS service, a blinded encryption key, wherein the blinded encryption key is based on processing of the blinded random value based on the OPRF using another OPRF secret;
process the blinded encryption key based on the another blinding key in accordance with the OPRF unblinding operation to generate an encryption key;
encrypt another key based on the encryption key to generate a first wrapped key; and
process the first wrapped key and the random value to generate a second wrapped key.

11. The computing device of claim 9, wherein the processing circuitry is further configured to execute the operational instructions to:
determine a random value and a first wrapped key that are constituent values of a second wrapped key;
process the random value based on another blinding key in accordance with the OPRF blinding operation to generate a blinded random value;
transmit, via the communication system, the blinded random value to the another computing device that is associated with the KMS service;
receive, via the communication system and from the another computing device that is associated with the KMS service, a blinded decryption key, wherein the blinded decryption key is based on processing of the blinded random value based on the OPRF using another OPRF secret;
process the blinded decryption key based on the another blinding key in accordance with the OPRF unblinding operation to generate a decryption key; and
decrypt the first wrapped key based on the decryption key to generate an unwrapped key.

12. The computing device of claim 9, wherein at least one of:
the computing device includes a wireless smart phone, a cellular phone, a laptop, a personal digital assistant, a tablet, a personal computers (PC), a work station, or a video game device; or
the another computing device includes a Hardware Security Module (HSM).

13. The computing device of claim 9, wherein the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

14. A method for execution by a computing device, the method comprising:
generating a data identifier (ID) based at least one unique ID value associated with an encrypted data object that is encrypted based on a key;
generating a sub-key ID based on the data ID and a requester secret;
processing the sub-key is based on a blinding key in accordance with an Oblivious Pseudorandom Function (OPRF) blinding operation to generate a blinded input;
generating an Oblivious Key Access Request (OKAR) based on the blinded input;
transmitting, via an interface configured to interface and communicate with a communication system and via the communication system, the OKAR to another computing device that is associated with a Key Management System (KMS) service;
receiving, via the interface and via the communication system and from the another computing device that is associated with the KMS service, a blinded sub-key, wherein the blinded sub-key is based on processing of the OKAR based on an Oblivious Pseudorandom Function (OPRF) using an OPRF secret;
processing the blinded sub-key based on the blinding key in accordance with an OPRF unblinding operation to generate the key that is associated with the encrypted data object; and
accessing secure information based on the key.

15. The method of claim 14 further comprising:
generating the OKAR based on the blinded input and based on a challenge to be used by the KMS service to verify at least one of identity of the KMS service or correctness of operation of the KMS service;
receiving, via the interface and via the communication system and from the another computing device that is associated with the KMS service, the blinded sub-key and a response to the challenge;
determining whether the response to the challenge compares favorably to the challenge; and
based on a determination that the response to the challenge compares favorably to the challenge, processing the blinded sub-key based on the blinding key in accordance with the OPRF unblinding operation to generate the key that is associated with the encrypted data object.

16. The method of claim 14 further comprising:
generating a random value;
processing the random value based on another blinding key in accordance with the OPRF blinding operation to generate a blinded random value;
transmitting, via the interface and via the communication system, the blinded random value to the another computing device that is associated with the KMS service;
receiving, via the interface and via the communication system and from the another computing device that is associated with the KMS service, a blinded encryption key, wherein the blinded encryption key is based on processing of the blinded random value based on the OPRF using another OPRF secret;
processing the blinded encryption key based on the another blinding key in accordance with the OPRF unblinding operation to generate an encryption key;
encrypting another key based on the encryption key to generate a first wrapped key; and
processing the first wrapped key and the random value to generate a second wrapped key.

17. The method of claim 14 further comprising:
determining a random value and a first wrapped key that are constituent values of a second wrapped key;
processing the random value based on another blinding key in accordance with the OPRF blinding operation to generate a blinded random value;

transmitting, via the interface and via the communication system, the blinded random value to the another computing device that is associated with the KMS service;

receiving, via the interface and via the communication system and from the another computing device that is associated with the KMS service, a blinded decryption key, wherein the blinded decryption key is based on processing of the blinded random value based on the OPRF using another OPRF secret;

processing the blinded decryption key based on the another blinding key in accordance with the OPRF unblinding operation to generate a decryption key; and decrypting the first wrapped key based on the decryption key to generate an unwrapped key.

18. The method of claim 14 further comprising:

generating the OKAR based also on an OPRF key ID (OKI) that specifies the OPRF secret of a plurality of OPRF secrets of the KMS service, wherein the blinded key is based on processing of the OKAR based on the OPRF using the OPRF secret that is specified in the OKAR.

19. The method of claim 18, wherein the OKI includes at least one of:

an OKI version number that indicates how fields in the OKI are represented;

OPRF parameters;

an OPRF public key;

a result of a deterministic function applied to the OPRF public key that binds the OKI to the OPRF secret;

an owner ID that specifies an owner of the OPRF secret;

a validity period during which the OPRF key is valid; or a digital signature.

20. The method of claim 14, wherein at least one of:

the computing device includes a wireless smart phone, a cellular phone, a laptop, a personal digital assistant, a tablet, a personal computers (PC), a work station, or a video game device;

the another computing device includes a Hardware Security Module (HSM); or the communication system includes at least one of a wireless communication system, a wire lined communication system, a non-public intranet system, a public internet system, a local area network (LAN), a wireless local area network (WLAN), a wide area network (WAN), a satellite communication system, a fiber-optic communication system, or a mobile communication system.

* * * * *